(12) United States Patent
Shau

(10) Patent No.: US 10,161,953 B2
(45) Date of Patent: Dec. 25, 2018

(54) FLOW METERS ATTACHED TO ATHLETIC HEADGEAR

(71) Applicant: David Shau, Palo Alto, CA (US)

(72) Inventor: David Shau, Palo Alto, CA (US)

( * ) Notice: Subject to any disclaimer, the term of this patent is extended or adjusted under 35 U.S.C. 154(b) by 94 days.

(21) Appl. No.: 15/404,080

(22) Filed: Jan. 11, 2017

(65) Prior Publication Data
US 2018/0088146 A1 Mar. 29, 2018

Related U.S. Application Data

(63) Continuation-in-part of application No. 15/291,206, filed on Oct. 12, 2016, which is a continuation-in-part of application No. 15/275,583, filed on Sep. 26, 2016.

(51) Int. Cl.

| | |
|---|---|
| *G01P 5/00* | (2006.01) |
| *A63B 33/00* | (2006.01) |
| *H04R 1/02* | (2006.01) |
| *G10L 13/02* | (2013.01) |
| *G06F 3/16* | (2006.01) |
| *A42B 3/04* | (2006.01) |
| *G01P 7/00* | (2006.01) |
| *H04R 1/10* | (2006.01) |
| *H04R 5/04* | (2006.01) |

(52) U.S. Cl.
CPC ............... *G01P 5/00* (2013.01); *A42B 3/0433* (2013.01); *A63B 33/002* (2013.01); *G01P 7/00* (2013.01); *G06F 3/167* (2013.01); *G10L 13/02* (2013.01); *H04R 1/028* (2013.01); *A63B 2033/004* (2013.01); *H04R 1/1016* (2013.01); *H04R 5/04* (2013.01)

(58) Field of Classification Search
CPC ..... A42B 1/245; A42B 3/30; A63B 2033/004; A63B 33/002; G06F 3/167; G01P 5/00; G01L 13/02; H04R 1/028; H04R 3/00
See application file for complete search history.

(56) References Cited

U.S. PATENT DOCUMENTS

| | | |
|---|---|---|
| 3,944,345 A | 3/1976 | Decorato |
| 4,286,340 A | 9/1981 | Lathrop |
| 5,581,822 A | 12/1996 | Tagyo |

(Continued)

FOREIGN PATENT DOCUMENTS

| | | |
|---|---|---|
| CN | 201105124 | 8/2008 |
| FR | 2630653 | 11/1989 |

*Primary Examiner* — Francis C Gray

(57) ABSTRACT

Swimming goggles are developed to allow a swimmer to see the end of the pool without moving their head while swimming in backstroke. Using a light reflector, a swimmer can see through a backstroke viewing window, allowing them to see along the direction that they are moving when swimming backstroke. Using a motion sensor and electric control circuits, a swimming goggle can provide optimum views for the swimmer wearing the swimming goggle. Using a sound speaker, a swimming goggle can play music and provide voice reports to the swimmer. Flow meters and inclinometers can be used provide measurements with better accuracy. The electronic controller for a swimming goggle can either be embedded as part of a swimming goggle, or can be detachable to support more than one swimming goggle. Besides swimming goggles, the electronic devices also can be attached onto athletic headgears such as eye goggles, sweat bands, hats, or helmets.

20 Claims, 16 Drawing Sheets

(56) References Cited

U.S. PATENT DOCUMENTS

| | | | | |
|---|---|---|---|---|
| 5,685,722 | A * | 11/1997 | Taba | A61B 5/222 |
| | | | | 434/247 |
| 8,681,006 | B2 * | 3/2014 | Yuen | A63B 71/0686 |
| | | | | 340/573.1 |
| 9,216,341 | B2 * | 12/2015 | Li | A61B 5/1112 |
| 2003/0138763 | A1 * | 7/2003 | Roncalez | A63B 24/0003 |
| | | | | 434/254 |
| 2006/0010587 | A1 | 1/2006 | Yokota | |
| 2006/0270450 | A1 * | 11/2006 | Garratt | G01S 19/13 |
| | | | | 455/556.1 |
| 2007/0109491 | A1 * | 5/2007 | Howell | G02C 11/10 |
| | | | | 351/41 |
| 2014/0160250 | A1 * | 6/2014 | Pomerantz | H04N 5/23229 |
| | | | | 348/47 |

* cited by examiner

| M1 | M2 | M3 | M4 | Actions |
|---|---|---|---|---|
| 0 | 0 | x | x | Do nothing, power down |
| 0 | 1 | 0 | 0 | Play music |
| 0 | 1 | 0 | 1 | Play music while swimming |
| 0 | 1 | 1 | 0 | Synchronize music tempo to swimming pace |
| 0 | 1 | 1 | 1 | Adjust volume according to swimming speed |
| 1 | 0 | 0 | 0 | Lap count |
| 1 | 0 | 0 | 1 | Lap count + lap time |
| 1 | 0 | 1 | 0 | Lap count + lap time + stroke count |
| 1 | 0 | 1 | 1 | Report Calories burned |
| 1 | 1 | 0 | 0 | Lap count + music |
| 1 | 1 | 0 | 1 | Lap count + lap time + music |
| 1 | 1 | 1 | 0 | Lap count + lap time + paced music |
| 1 | 1 | 1 | 1 | Store data into memory |

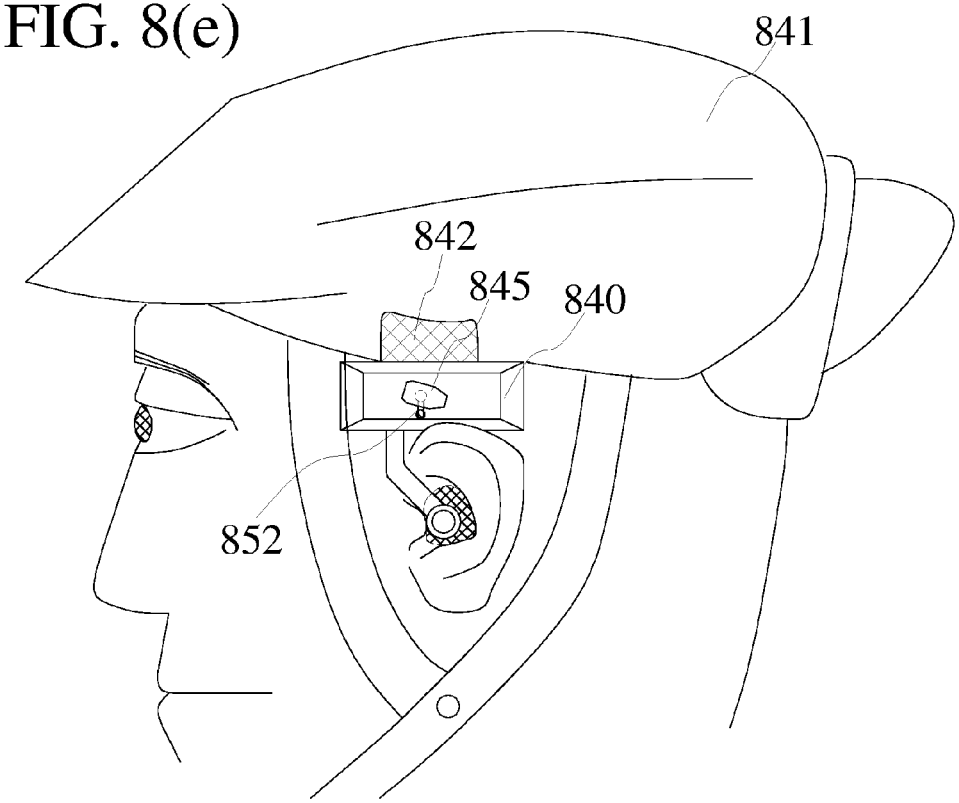
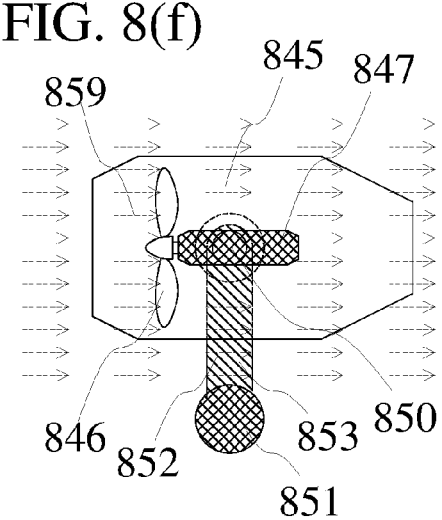
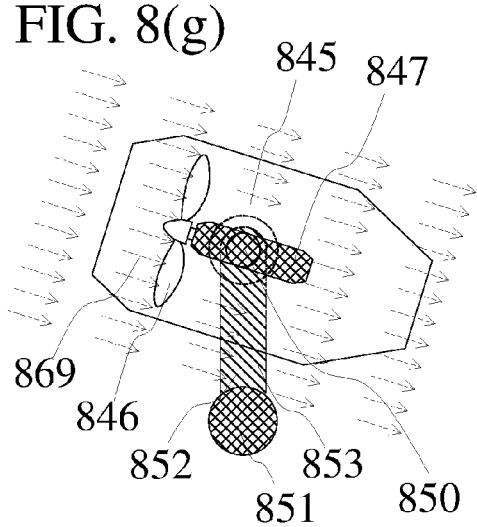

FLOW METERS ATTACHED TO ATHLETIC HEADGEAR

This application is a continuation-in-part application of the previous patent application with a Ser. No. 15/291,206, with a title "Electric Controllers for Swimming Goggles", and filed by David Shau on Oct. 12, 2016. Patent application Ser. No. 15/291,206 is a continuation-in-part application of the previous patent application with a Ser. No. 15/275,583, with a title "Swimming Goggles", and filed by David Shau on Sep. 26, 2016.

BACKGROUND OF THE INVENTION

The present invention relates to electronic devices that can be attached to swimming goggles or other athletic headgear.

Swimming is a sport that keeps people in great shape. Swimming exercises most of the body's muscles, and swimming can even save one's life. For most of competitive sports, it is almost guaranteed that people will eventually get hurt by sport injuries. In comparison, swimming is a sport that rarely causes serious injury. However, like me, most swimmers have bumped their head at the end of the pool while swimming backstroke. While at full sprinting speed, this type of injury may even result in minor concussions, and is also quite painful. It is desirable to design swimming goggles that allow swimmers to see the end of the pool without moving their head while swimming in backstroke. Also, backstroke swimmers often swim in a curvy zigzag path in their lane instead of a simple direct straight line. If the swimmer swims in a zigzag path, then the distance that they swim will be longer, and it also makes them look bad. It is desirable for a swimmer to see the sights behind them while swimming backstroke, so that they may line up their position, thus allowing the swimmer to swim in a straight line. It is also desirable to have swimming goggles that can help swimmers maintain proper head position while swimming backstrokes.

Decorato in U.S. Pat. No. 3,944,345 disclosed a swimming goggle equipped with special lens that attaches onto the front of the eye sockets, increasing the user's lateral vision. It, however, does not enable the ability to see behind his or herself, and does not provide wide enough visual range to support backstroke.

Lathrop in U.S. Pat. No. 4,286,340 disclosed a pair of comfortable competition goggles with anti fog washing, watertight fits that enhance the eyesight, and improved forward vision that allows the user to see the wall without lifting their head while swimming the crawl, breast, and butterfly strokes. The swimming goggles, however, does not improve backwards vision, and cannot benefit the ability to see the end of the pool without moving their head while swimming in backstroke.

Tagyo in U.S. Pat. No. 5,581,822 disclosed an attractively shaped pair of goggles that provide watertight vision, and allow the user to swim faster due to its smooth single large lens. It, however, does not provide the ability to see the wall while swimming backstroke.

Yokota in U.S. Patent Application No. 20060010587 disclosed a pair of goggles that use a contact section that attaches to the area around the eye in the eye socket, therefore, improving the user's field vision. The goggles also prevent light refraction that may cause discomfort to the owner. These goggles may enhance the peripheral vision while swimming backstroke, but it does not give a clear vision of the wall; the swimmers still need to change their normal head positions to see the wall. It also does not use a light reflector.

Desbordes in French patent number FR 2630653 disclosed a swimming goggle that has a backstroke viewing window and a light reflector. The light reflector does not switch position with respect to the front viewing window, and it does not change position depending on the body motions of the swimmer.

Huang in Chinese patent number CN201105124 disclosed a swimming goggle that has a backstroke viewing window and a light reflector. Huang apparatus provides visibility to overhead direction when the swimmer is in position for backstroke, freestyle, and diving in order to avoid colliding with other swimmers in a crowed swimming pool. Huang's apparatus does not address the needs to view different parts of the swimming pool while the swimmer is swimming backstroke versus freestyle.

None of the above prior art swimming goggles comprise electric control mechanisms.

Gear worn by swimmers must be able to withstand strong forces in the water when swimmers are diving, turning, or swimming various strokes at high speeds. The previous application with the Ser. No. 15/275,583 disclosed swimming goggles embedded with an electronic controller able to analyze the actions of a swimmer to provide feedback using voice, music, or by adjusting goggle components. When the electronic controller is built-in as part of a swimming goggle, it is inseparable from the goggle, which naturally allows the controller to withstand forces exerted by the water while swimming. The disadvantage of having an embedded electronic controller in a swimming goggle is that the controller will be useless once the goggle breaks or wears out. It is therefore desirable to have an electronic controller that can be detached from a swimming goggle so that the same electronic controller can be utilized on multiple swimming goggles.

The previous applications with the Ser. Nos. 15/275,583 and 15/291,206 disclosed electronic devices embedded in or attached to swimming goggles. Using motion sensors, those electronic devices are able to analyze the actions of a swimmer, and in turn provide feedback using voice, music, or by adjusting goggle components. Accelerometers are one type of motion sensor that can support such electronic devices. An accelerometer provides electrical outputs that are proportional to the acceleration vector experienced by the sensor; other motion related parameters, such as speed, distance traveled, and Calories burnt can be calculated from the acceleration vectors measured by the accelerometers. However, parameters determined by calculation are often not as accurate as parameters determined by direct measurements. It is therefore desirable to use flow meters to measure speed directly, instead of calculating speed from acceleration measurements.

A flow meter is a meter that measures the velocity of fluid movement. Fluid speed can be measured in a variety of ways. Displacement flow meters accumulate a fixed volume of fluid and then count the number of times the volume is filled to measure fluid speed. Other flow meters measure forces produced by the flowing stream on a known constriction to calculate fluid speed. Fluid speed may be measured by measuring the velocity of fluid over a known area. Athletic headgear can include swimming goggles, eye goggles, sweat bands, hats, or helmets.

SUMMARY OF THE PREFERRED EMBODIMENTS

A primary objective of the preferred embodiments is, therefore, to provide swimming goggles that allow the user to see behind him or her without changing their normal head position while swimming backstroke. This will reduce the chance of injury, since they can now see where the wall is. Another objective is to prevent the swimmer from swimming in a zigzag manner when they swim across the pool in their lane. This will allow the swimmer to go faster, and prevent the user from crashing into the lane lines. Another primary objective is to provide sophisticated motion related information to a swimmer while the swimmer is swimming. Another objective is to provide an electronic controller that can be detached from a swimming goggle so that the same electronic controller can be utilized on multiple swimming goggles. Another primary objective is to provide accurate measurements of the speed of the users. Another objective is to re-charge the battery while the users are swimming or exercising. These and other objectives are assisted by providing swimming goggles with backstroke viewing windows at the eye sockets, using motion sensors such as accelerometers or flow meters, and using integrated circuits attached to the athletic headgear.

While the novel features of the invention are set forth with particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 1(*b*) shows the swimming goggle in FIG. 1(*a*) while the light blocking cover of the backstroke viewing window is closed;

FIG. 1(*c*) shows a goggle without a light blocking cover on the backstroke viewing window;

FIG. 1 (*d*) shows a goggle with backstroke viewing windows on both eye sockets;

FIG. 3(*b*) shows a simplified view of a user who is swimming backstroke on his back;

FIG. 5(*b*) shows a close up of the electric controller in FIG. 5(*a*);

FIG. 5(*c*) is a symbolic block diagram for the electric controller and output devices in FIG. 5(*b*);

FIG. 5(*d*) is a symbolic block diagram illustrating how procedures are executed to determine the actions of a swimmer wearing a swimming goggle equipped with the electric controller in FIG. 5(*c*);

FIG. 5(*e*) is a flowchart for an exemplary application program used by the electric controller in FIG. 5(*c*);

FIG. 5(*f*) is a flowchart for another exemplary application program used by the electric controller in FIG. 5(*c*);

FIG. 5(*g*) shows a table that lists exemplary modes supported by the electric controller in FIG. 5(*c*);

FIG. 5(*h*) is a symbolic block diagram illustrating how procedures are executed to determine the actions of a swimmer wearing a swimming goggle equipped with flow meters;

FIG. 9(*b*) is an exemplary symbolic block diagram for the electronic device and output devices in FIGS. 8(*e, f*).

DETAILED DESCRIPTION OF THE PREFERRED EMBODIMENTS

Figure 1A:
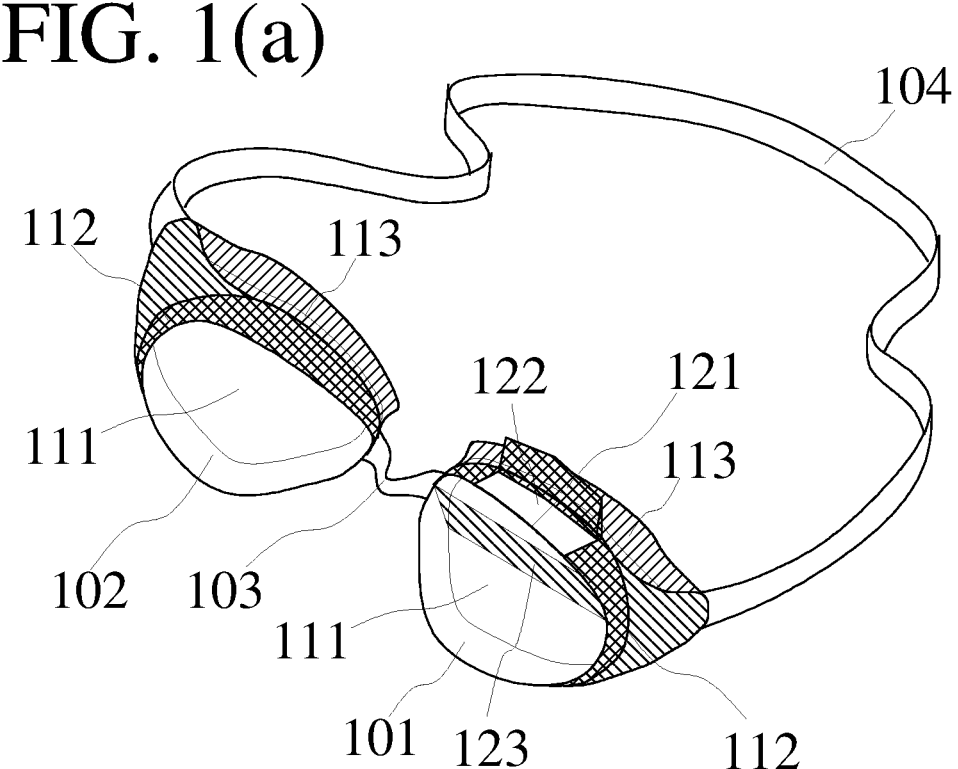
FIG. 1(*a*) shows one example of the swimming goggles of the present invention that has a backstroke viewing window on one eye socket.
Figure 1B:
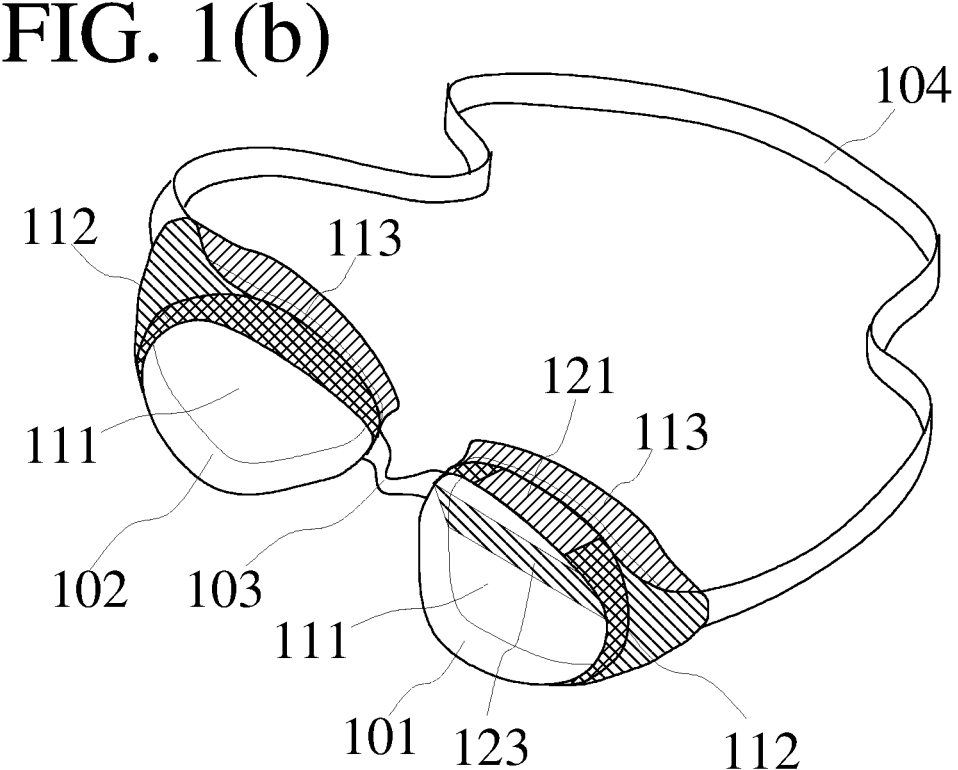

FIGS. 1(*a-d*) show examples of the goggles of the present invention. The goggles in these examples comprise two eye sockets (101,102) connected by a nosepiece (103) and a head strap (104). Each eye socket (101,102) has a forward viewing window (111) that is mounted on a suction socket (113). Typically, the forward viewing window (111) is made of transparent plastic plate, and the suction socket (113) is made of rubber or plastic. The suction socket (113) sticks onto swimmer's eyes, creating a water tight seal while providing a space between the eye and the forward viewing window (113), allowing clear under-water vision. These structures are similar to those used in conventional swimming goggles. In addition, the examples in FIGS. 1(*a-d*) contain structures that are designed to allow the swimmer to see the end of the pool without moving their head while swimming in backstroke. For example, FIGS. 1(*a, b*) illustrate a goggle that has a backstroke viewing window (122) opened at the upper side (112) of the eye socket. A backstroke viewing window, by definition, is a transparent window on the eye socket of a swimming goggle that faces upward direction while the swimmer wearing the goggle is standing upright so that it faces the end of swimming pool when the swimmer is in normal head position while swimming backstroke. A backstroke viewing window is typically nearly vertical to the front viewing window. In this example, the backstroke viewing window (122) is made of transparent plastic. To prevent unwanted peripheral lights, the backstroke viewing window (122) can be covered with a light blocking cover (121). FIG. 1(*a*) illustrates the situation when the light blocking cover (121) of the backstroke viewing window (122) is opened, and FIG. 1(*b*) illustrates the situation when the light blocking cover (121) is closed. In this example, a light reflector (123) is placed inside the eye socket (101), as illustrated in FIGS. 1(*a, b*). In this example, the light reflector (123) is a transparent plastic plate supporting the functions of a half-mirror. A half-mirror, by definition, is a light reflector that is partially transparent and partially reflecting. In this example, the index of reflection of the light reflector (123) is adjusted in such way that the reflected view is more dominating than the transparent view. When the light blocking cover (121) of the backstroke viewing window (122) is opened, as shown in FIG. 1(*a*), the light that travels through the backstroke viewing window (122) is reflected by the light reflector (123), allowing the swimmer to see the end of the pool without moving head while swimming in backstroke. When the light blocking cover (121) of the backstroke viewing window (122) is closed, as shown in FIG. 1(b), almost no light would come from the upward direction so that the swimmer would see views at the front direction through the half-mirror light reflector (123).

While the preferred embodiments have been illustrated and described herein, other modifications and changes will be evident to those skilled in the art. For example, the light reflector (123) can be a mirror instead of a half-mirror. For another example, FIG. 1(c) shows another goggle that has a backstroke viewing window (124) without a light blocking cover. This goggle can be manufactured at lower cost, but users may see unwanted lights from upward direction. Another example in FIG. 1(d) shows a goggle with backstroke viewing windows (124, 125) and light reflectors (123, 126) in both eye sockets (101,102). This goggle allows better upward vision because both eyes are now able to see the same reflection, but front view will be less clear. It is to be understood that there are many other possible modifications and implementations so that the scope of the invention is not limited by the specific embodiments discussed herein.

Figure 2A:
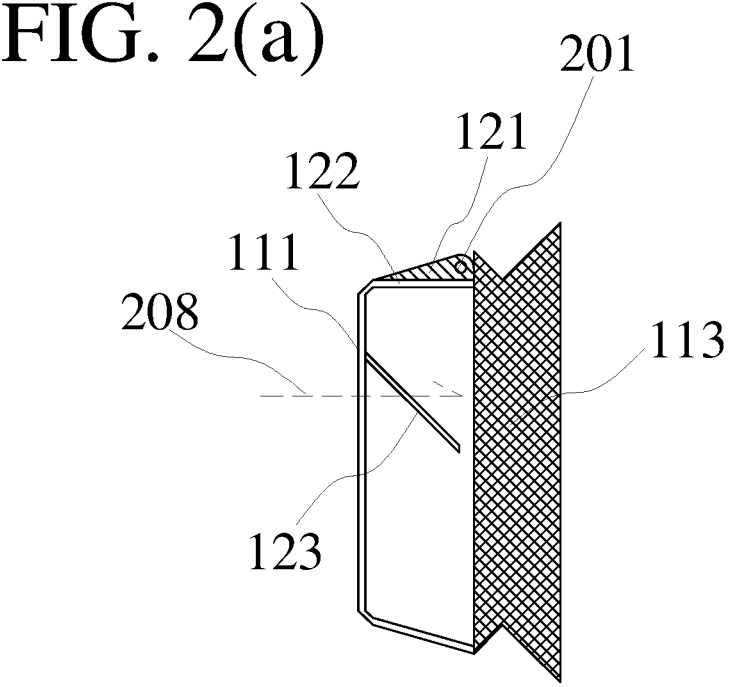
FIGS. 2(*a, b*) are cross-section views of an eye socket that can automatically switch the position of the light blocking cover of the backstroke viewing window.
Figure 2B:
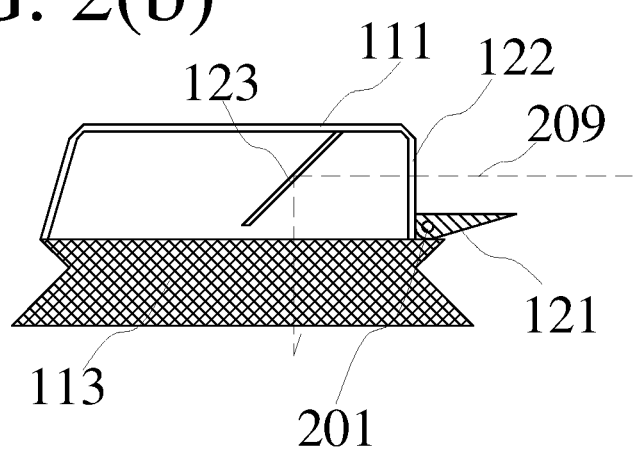
Figure 3A:
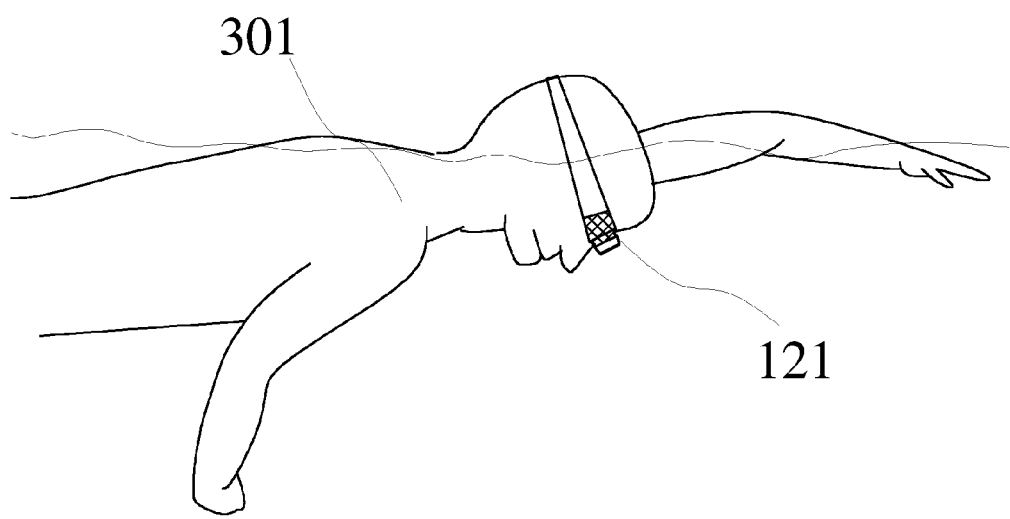
FIG. 3(*a*) shows a simplified view of a user who is swimming freestyle on his front.
Figure 3B:
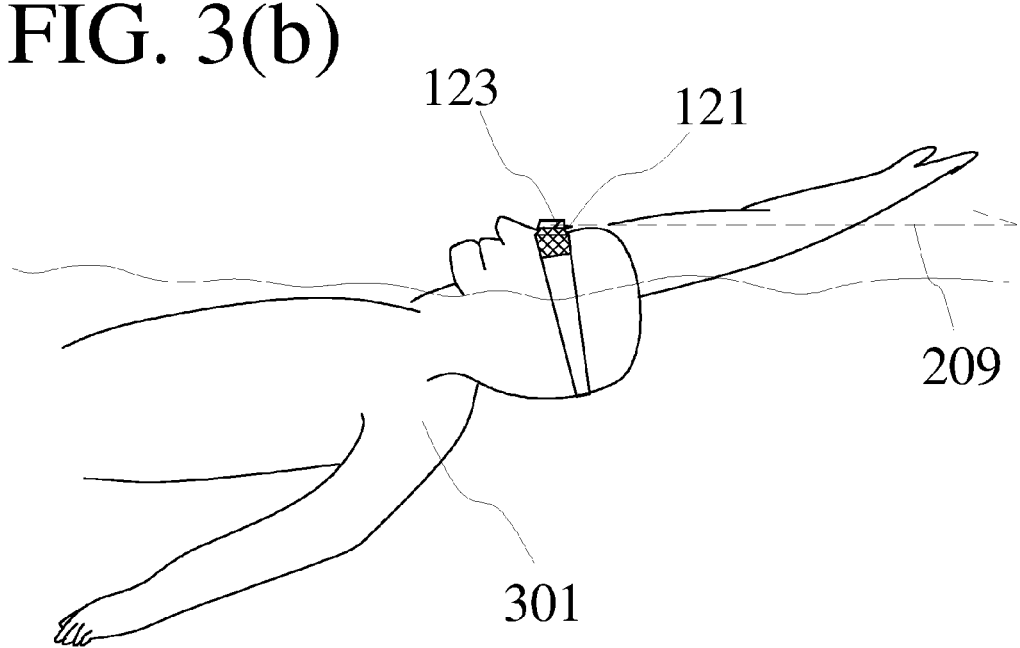

The light blocking cover (121) of the backstroke viewing window (122) shown in FIGS. 1(a, b) may be opened or closed manually. A swimmer can open the light blocking cover while swimming backstroke, and close it while swimming other strokes. While swimming melody, a swimmer needs to swim backstroke and other strokes. Flipping the light block cover while swimming can be troublesome. It is desirable to open or close the light blocking cover (121) automatically according to the stroke the swimmer is swimming. FIGS. 2(a-b) show cross-section views of an eye socket that can open or close the light blocking cover (121) automatically. In this example, the light blocking cover (121) is designed to rotate around a rotation axis (201). When the socket is at a position as illustrated in FIG. 2(a), the light blocking cover (121) is closed due to gravity. Under this situation, the light (208) passes directly through the half mirror (123) allowing the user to see what they would normally see while facing forward. Due to gravity, the light blocking cover (121) is also closed when the eye socket is facing downward. FIG. 3(a) illustrates the situation when a swimmer (301) wearing the goggle is swimming freestyle. Under this situation, the light blocking cover (121) of the backstroke viewing window is closed so that the swimming goggle functions as a conventional goggle. While swimming backstroke, the eye socket would face upward as illustrated by FIG. 3(b) and by the cross-section diagram in FIG. 2(b). At this position, the light blocking cover (121) would rotate backward along the rotation axis (201) by gravity, opening the backstroke viewing window (122) as illustrated in FIG. 2(b). The light (209) through the opened window (122) is reflected by the light reflector (123), allowing the swimmer (301) to see the end of the pool without moving his head while swimming in backstroke.

While the preferred embodiments have been illustrated and described herein, other modifications and changes will be evident to those skilled in the art. It is to be understood that there are many other possible modifications and implementations so that the scope of the invention is not limited by the specific embodiments discussed herein. For example, the light reflector also can be automatically switched into position as shown by the cross-section diagrams in FIGS. 4(a-b).

Figure 4A:
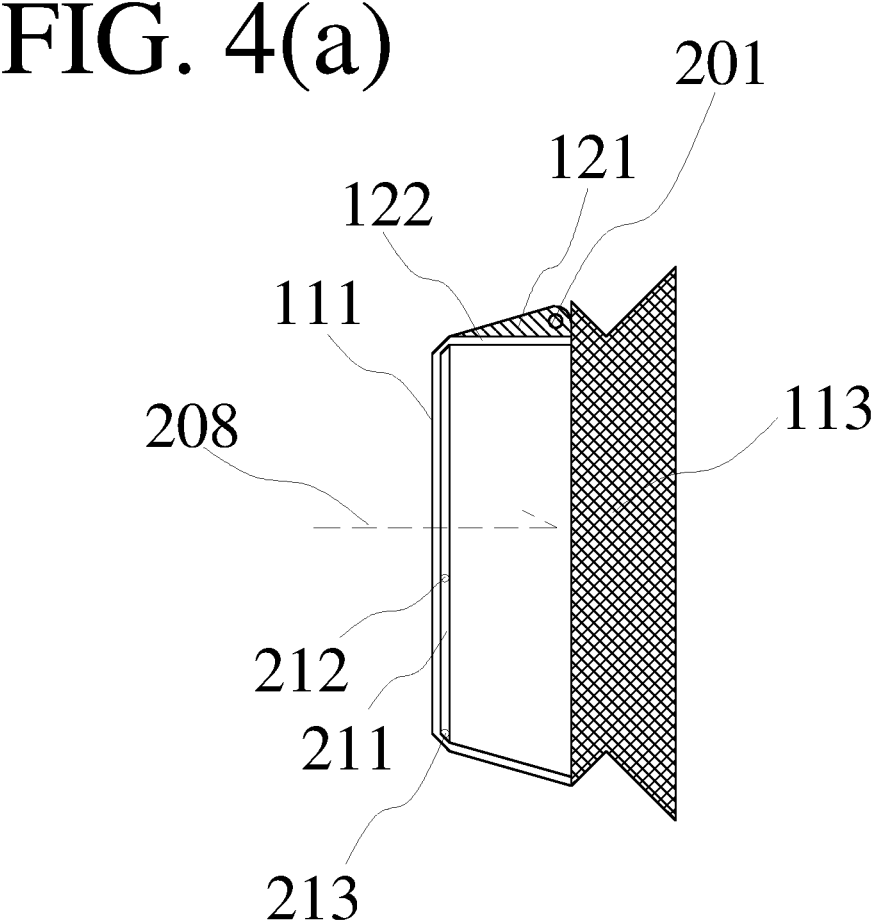
FIGS. 4(*a, b*) are cross-section views of an eye socket that can automatically switch the positions of the light blocking cover and the light reflector.
Figure 4B:
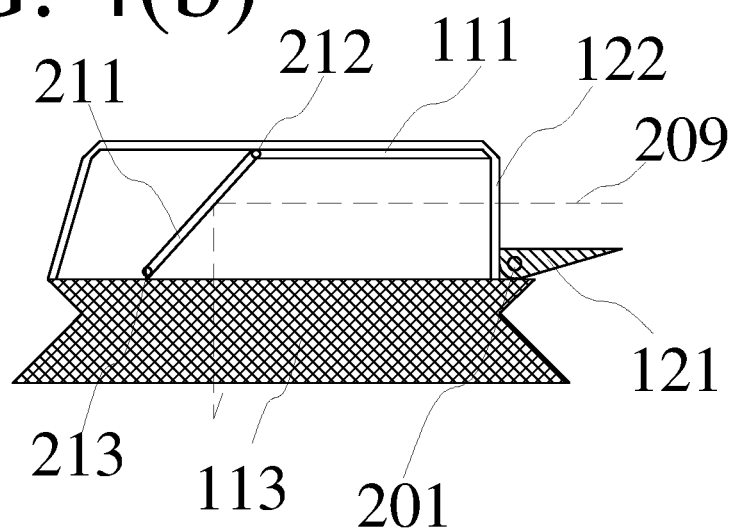

The eye socket shown in FIGS. 4(a-b) is similar to the eye socket shown in FIGS. 2(a, b) except that it has a light reflector (211) that can rotate against a rotation axis (212). A weight (213) is placed near the end of the light reflector (211) so that its position can be switched by gravity. When the socket is at a position illustrated in FIG. 4(a), the light reflector (211) is pulled by gravity to be in contact with the front viewing window (111) and functions as part of the front viewing window. Under this situation, the eye socket behaves as a conventional eye socket. Due to gravity, the position of this light reflector (211) would remain the same while the swimmer is swimming freestyle, breast, or butterfly strokes. While swimming backstroke, the eye socket would face upward, and the light reflector (211) would fall down due to gravity, as shown in FIG. 4(b). The light (209) through the opened backstroke viewing window (122) is reflected by the light reflector (21 1), allowing the swimmer to see the end of the pool without moving their head while swimming in backstroke.

The preferred embodiments of the present invention provide swimming goggles that allow the user to see the end of swimming pool without changing normal head position while swimming backstroke. The chance of injury is reduced because backstroke swimmers can now see where the wall is. The backstroke swimmer also can adjust swimming direction by vision to swim in straight line to achieve better time. These and other objectives are achieved by opening backstroke viewing windows at the eye sockets of swimming goggles. A light blocking cover can be used to prevent unwanted light going through the backstroke viewing window. The light blocking cover can be operated manually or automatically. A light reflector is typically used with the backstroke viewing window. This light reflector can be a half mirror or a full mirror. The light reflector also can be designed to change position automatically according the stroke the swimmer is swimming.

While the preferred embodiments have been illustrated and described herein, other modifications and changes will be evident to those skilled in the art. It is to be understood that there are many other possible modifications and implementations so that the scope of the invention is not limited by the specific embodiments discussed herein. While the examples in FIG. 4(a, b) automatically switch the position of the light blocking cover and the light reflector by gravity, we can also use the buoyant force of water, the body motions of the swimmer, and other methods to switch the positions of the light blocking cover or the light reflector. FIGS. 5(a-g) show an exemplary swimming goggle that switches the position of the light blocking cover and the position of the light reflector by an electric controller.

Figure 1C:
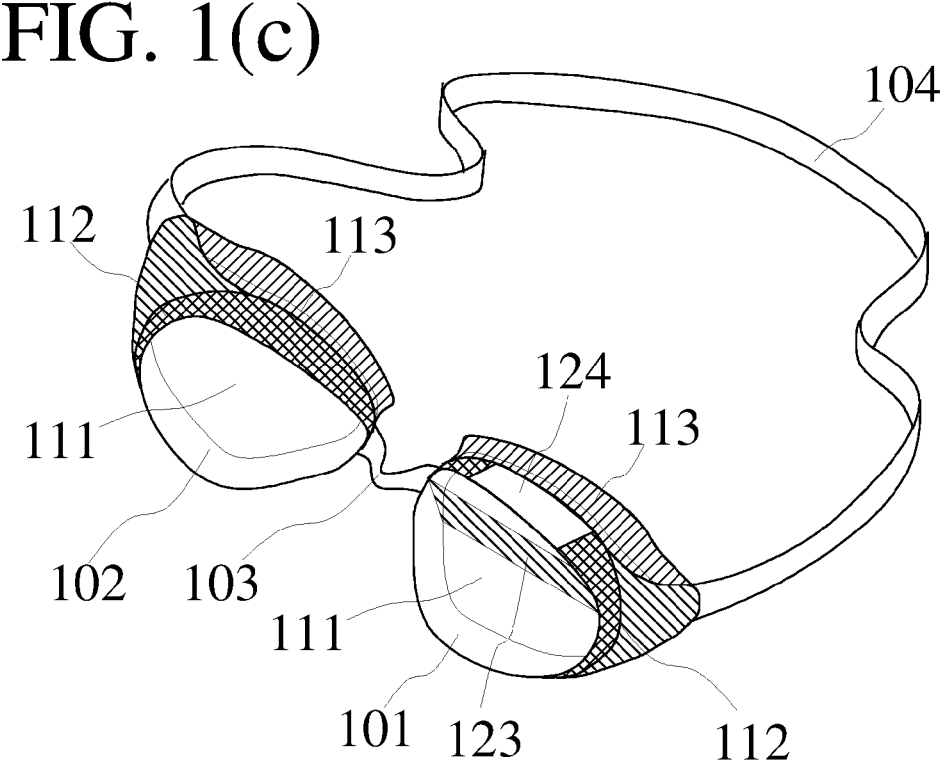
Figure 1D:
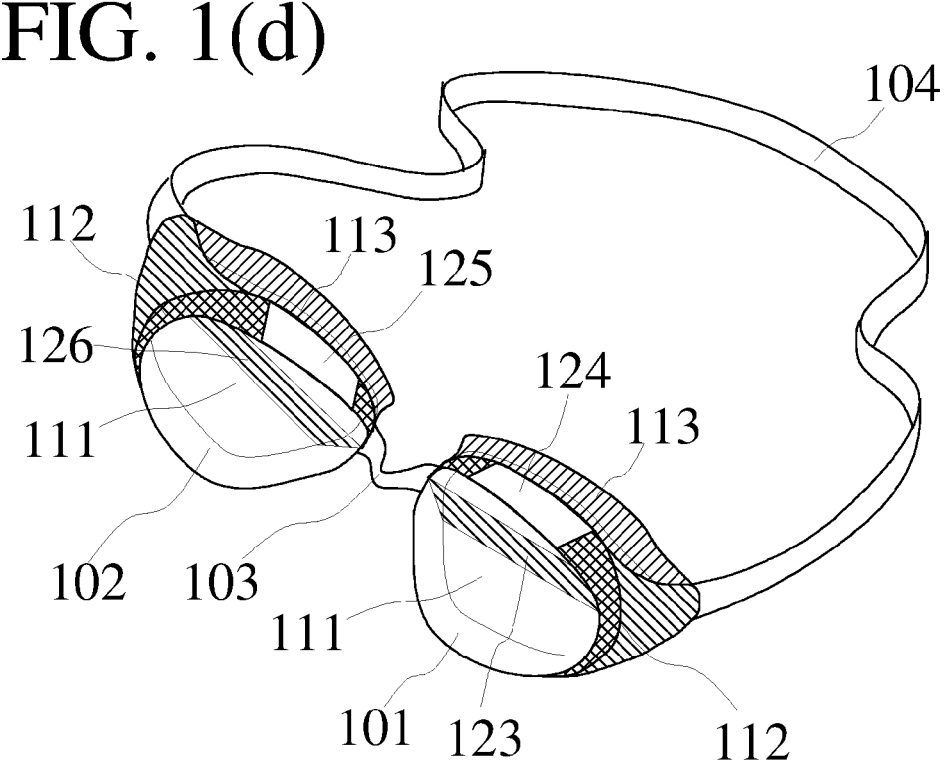
Figure 5A:
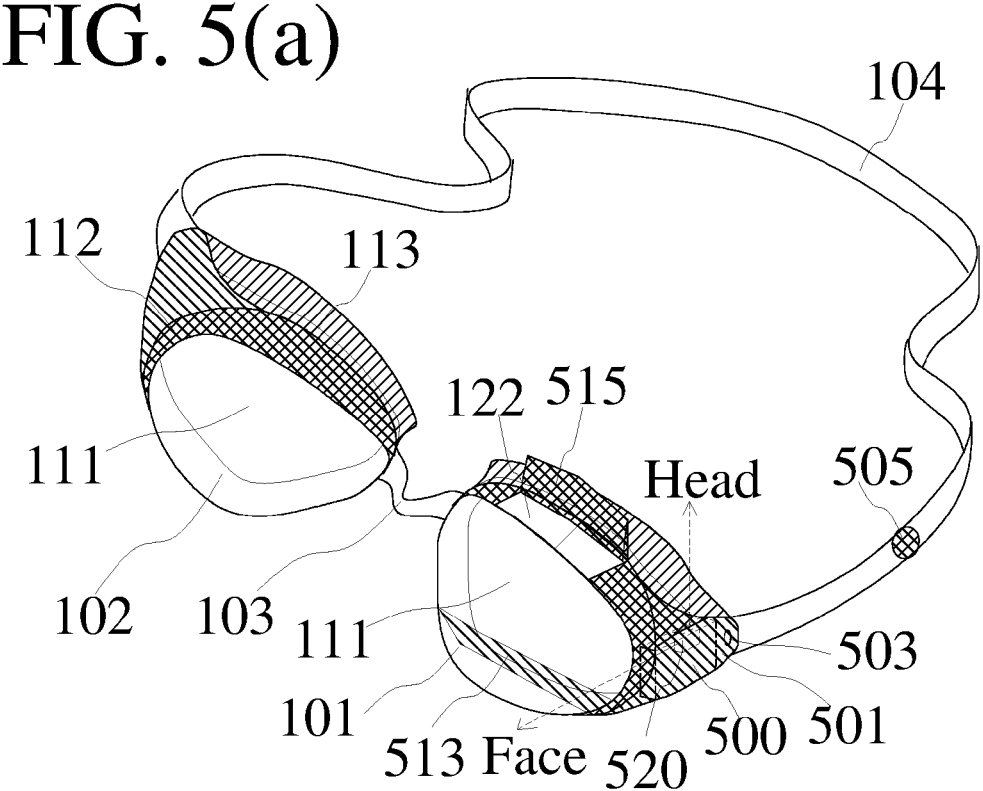
FIG. 5(*a*) shows a swimming goggle that has an electric controller (500) and an electric sound speaker (505)

FIG. 5(a) shows a swimming goggle that has the same structures as those of the swimming goggle in FIG. 1(a) except that the swimming goggle in FIG. 5(a) has an electric sound speaker (505) attached to its head strap (104), and an electric controller (500). This electric controller (500) is able to control the position of a light reflector (513) and the position of a light blocking cover (51 5). The electric controller (500) is covered by a water-tight cover (501) when the goggle is used in water. A button (503) on the water-tight cover (501) allows the user to open the cover in order to adjust operation modes of the electric controller (500). A motion sensor (520) is placed inside of the electric controller (500). This motion sensor (520) is attached to the swimming goggle at a fixed position with respect to the forward viewing window (111), and outputs electric signals that are related to the motions of the swimmer wearing the swimming goggle. One example of a motion sensor that can be used for this purpose is the LIS332AR motion sensor made by STMicroelectronics. LIS332AR is an accelerometer that measures a three-dimensional acceleration vector, and outputs three voltages, which are proportional to the three components of the acceleration vector along its x, y, and z directions. For the example in FIGS. 5(a-g), the motion sensor (520) can be an LIS332AR accelerometer that is placed at a position where its x axis is pointing towards the viewing direction through the forward viewing window (111), as illustrated by the dashed lined arrows in FIGS. 5(a, b). This direction will be called the "Face direction" in the following discussions. The y axis of the motion sensor (520) is pointing towards the viewing direction through the back stroke viewing window (122), as illustrated by the dashed lined arrows in FIGS. 5(a, b). This direction will be called the "Head direction" in the following discussions. For this example, the electric sound speaker (505) is attached to the head strap (104) of the swimming goggle in FIG. 5(a). The electric sound speaker (505) also can be an earbud or a speaker in other shapes.

Figure 5B:
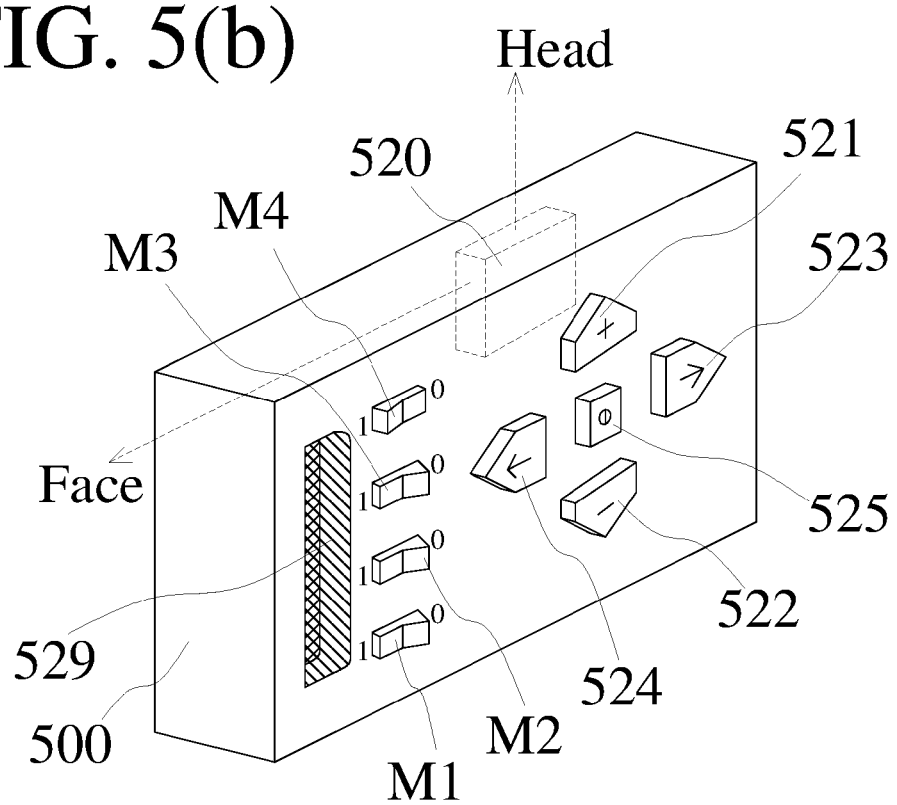
Figure 5C:
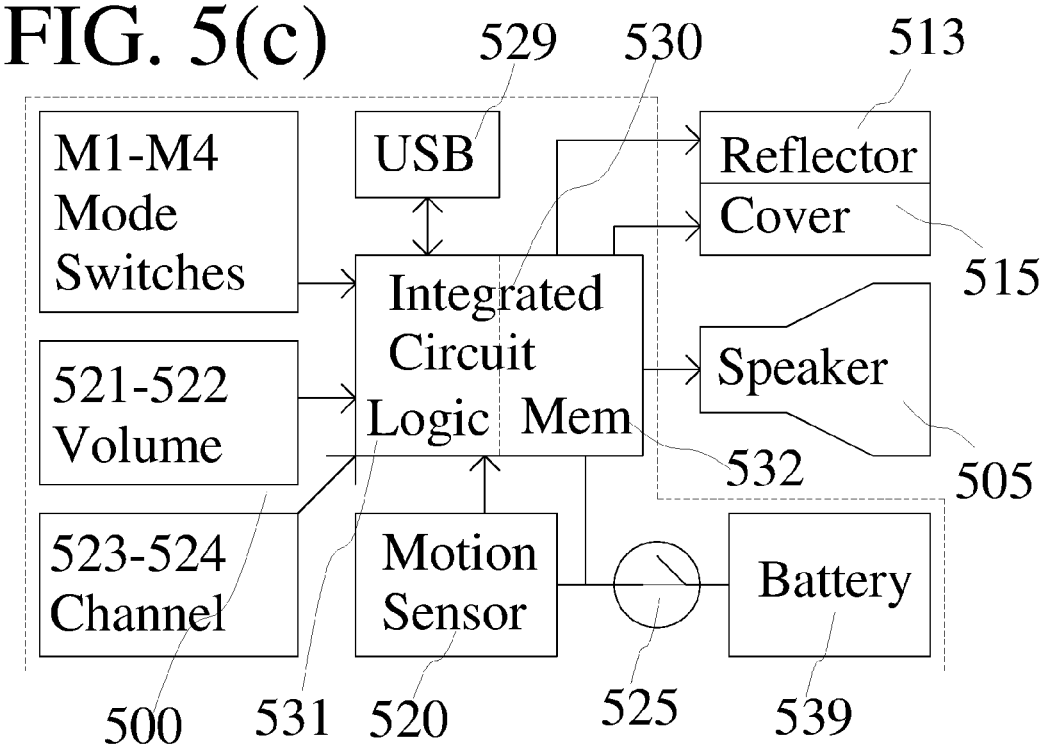

A user can open the water-tight cover (501) on the swimming goggle to reach the front panel of the electric controller (500). As shown in FIG. 5(b), the front panel of the electric controller (500) comprises a USB interface socket (529), four mode-select switches (M1-M4), two volume control switches (521-522), two channel-select switches (523, 524), and a power switch (525). All the other electric components of the electric controller (500) are sealed in water-proof packages so that they are not visible in FIG. 5(b). The motion sensor (520) is drawn in dashed lines in FIG. 5(b) with dashed lined arrows pointing to the head direction and the face direction. FIG. 5(c) is a block diagram that shows the components of the electric controller (500). The intelligence of the electric controller (500) is provided by an integrated circuit (530). In this example, the integrated circuit (530) comprises a memory module (532) and a logic module (531). One example of the logic module is a programmable microcontroller. One example of the memory module is a FLASH nonvolatile memory device. The memory module (532) and the logic module (531) can be one integrated circuit chip in the same package, and can also be separated integrated circuit chips in separated packages. In this example, the integrated circuit is programmable through the Universal Serial Bus (USB) interface (529) shown in FIGS. 5(b, c). A computer or a mobile electronic device can be used to program the integrated circuit (530) using the USB interface (520). The power lines of the USB interface are connected to a rechargeable battery (539). The electric connection between the rechargeable battery (539) and the integrated circuit (530) is controlled by a power switch (525). This power switch (525) is a toggle switch on the front panel of the electric controller (500), as shown in FIG. 5(b). The mode-select switches (M1-M4) determine the operation mode of the integrated circuit (530); an exemplary list of operation modes is shown in FIG. 5(g). The volume control switches (521, 522) control the volume of the speaker (505). The channel-select switches (523, 524) can be used to select music to be played by the speaker (505).

The logic module (531) of the integrated circuit (530) is able to analyze the outputs of the motion sensor (520) to determine the outputs of the integrated circuit (530), while the swimmer wearing the swimming goggle is swimming in water. The integrated circuit (530) is able to control the position of the reflector (513) and the light blocking cover (515) based on the motions of the swimmer detected by the motion sensor (520). The integrated circuit is also able to control the outputs of the electric sound speaker (505) while the swimmer wearing the swimming goggle is swimming in water.

Figure 5D:
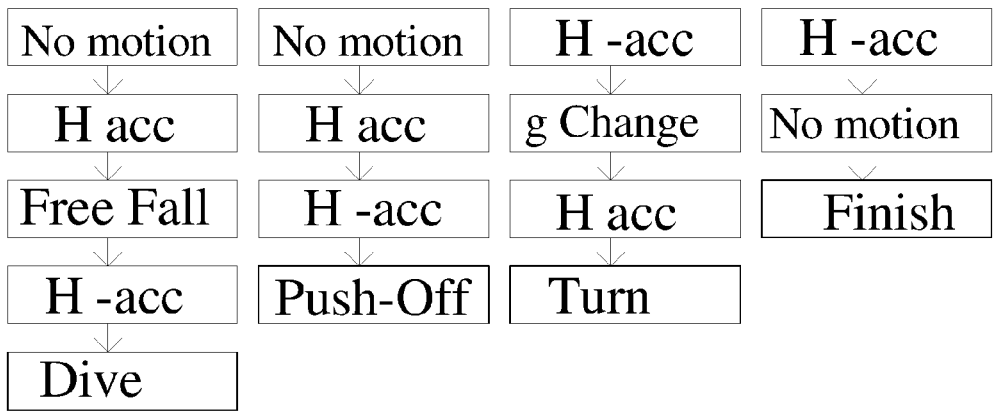
Figure 5D:
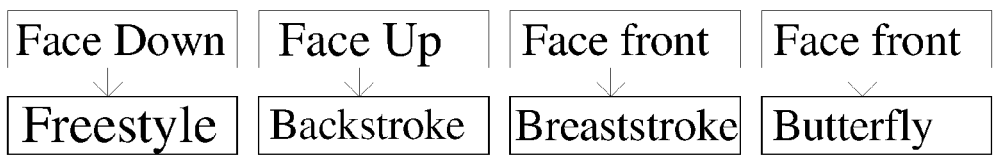

FIG. 5(d) is a simplified symbolic float chart for the sequences of events used to determine the actions of the swimmer using the outputs of the motion sensor (520). In FIGS. 5(d-g), the symbol "H acc" means the motion sensor detected a large acceleration in the head direction, and the symbol "H –acc" means the motion sensor detected a large negative acceleration in the head direction. For example, if the motion sensor (520) detects no motion initially, followed by a large acceleration in head direction (H acc), followed by a free fall, and ending with a large negative acceleration in head direction (H –acc), then the logic module (531) of the integrated circuit (530) would know that the swimmer just dived into water. This process is shown in the first column of FIG. 5(d). If the motion sensor (520) detects no motion initially, followed by a large acceleration in head direction (H acc), and ending with a large negative acceleration in head direction (H –acc) without a free fall in between, then the logic module (531) of the integrated circuit (530) would know that the swimmer just pushed off the wall of a swimming pool. This process is shown in the second column of FIG. 5(d). If the motion sensor (520) detects a large negative acceleration in head direction (H –acc), followed by a change in direction of the gravity g force relative to the orientation of the motion sensor (520), and ending with a large acceleration in head direction (H acc), then the logic module (531) of the integrated circuit (530) would know that the swimmer just performed a flip turn. This process is shown in the third column of FIG. 5(d). If the motion sensor (520) detects a large negative acceleration in head direction (H –acc), which ended with no motion, then the logic module (531) of the integrated circuit (530) would know that the swimmer just finished swimming. This process is shown in the fourth column of FIG. 5(d). The motion sensor (520) also can tell the integrated circuit (530) the angle between gravity (g) relative to the face direction. When the swimming is swimming face down, the integrated circuit (530) would know that the swimmer is swimming freestyle; when the swimming is swimming face up, the integrated circuit (530) would know that the swimmer is swimming backstroke; and when the swimming is swimming face front for a period of time during each stroke, the integrated circuit (530) would know that the swimmer is swimming either breaststroke or butterfly, which can be distinguished by detailed analysis, as shown by the examples in FIG. 5(d).

Figure 5E:
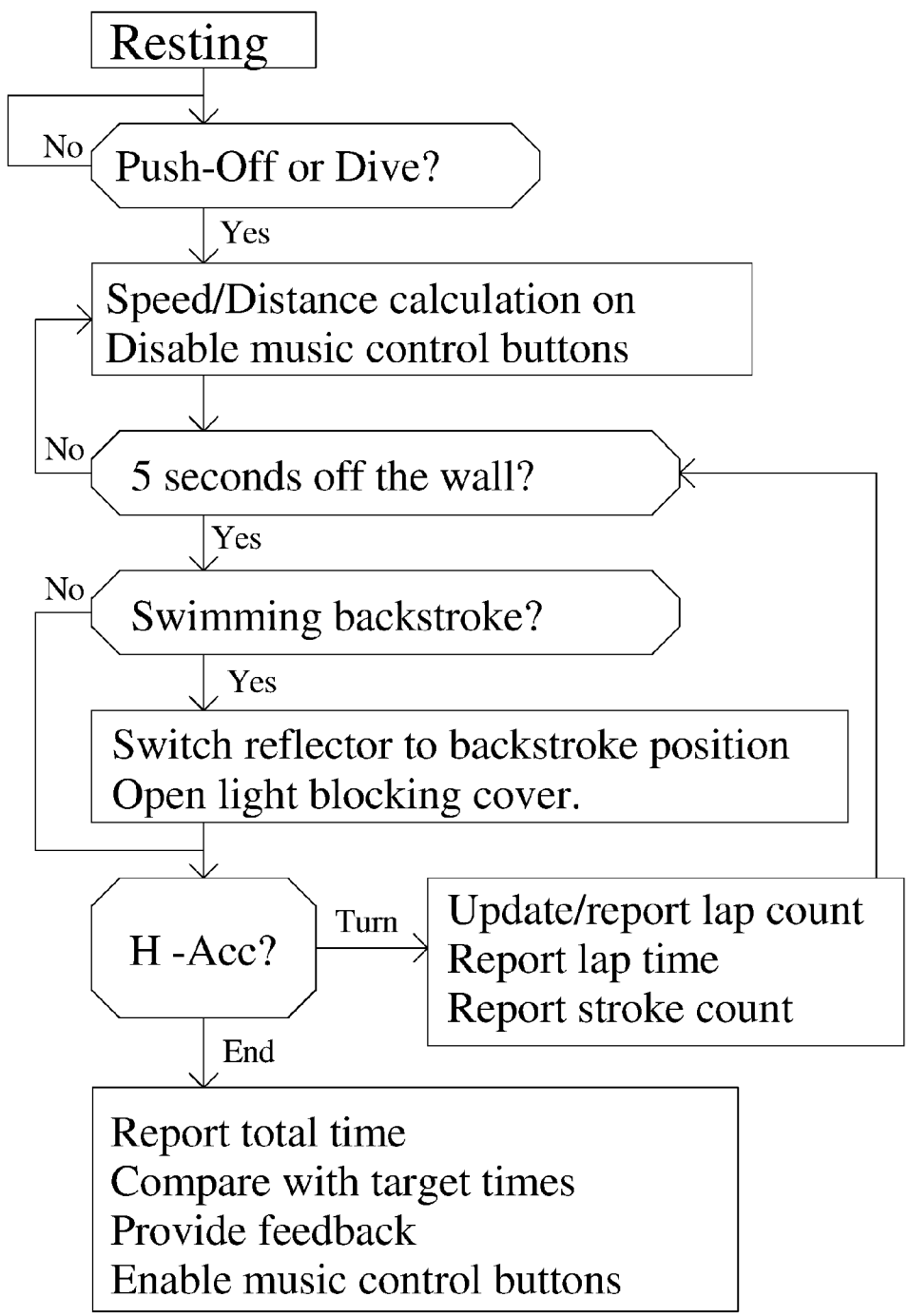
Figure 5F:
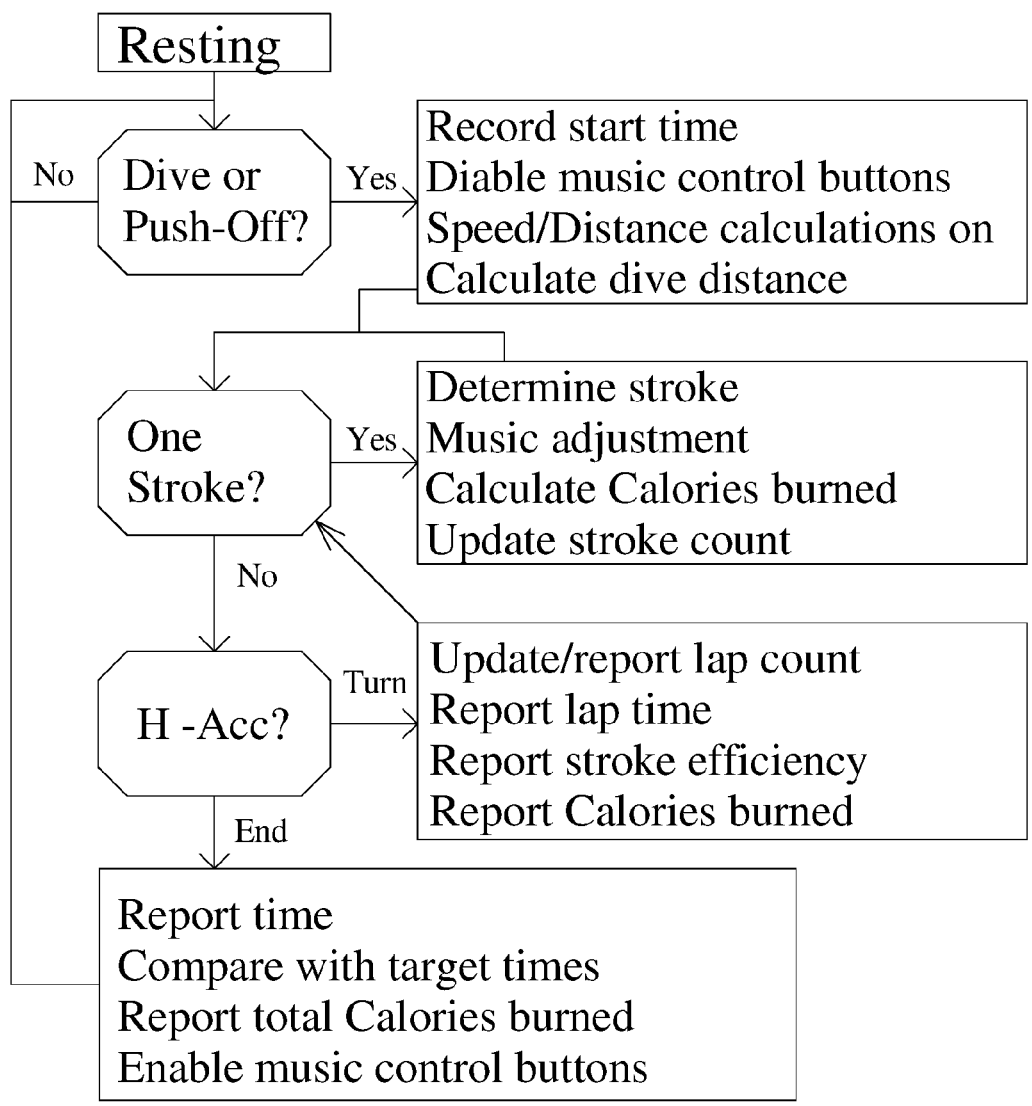
Figures 5G, 5H:
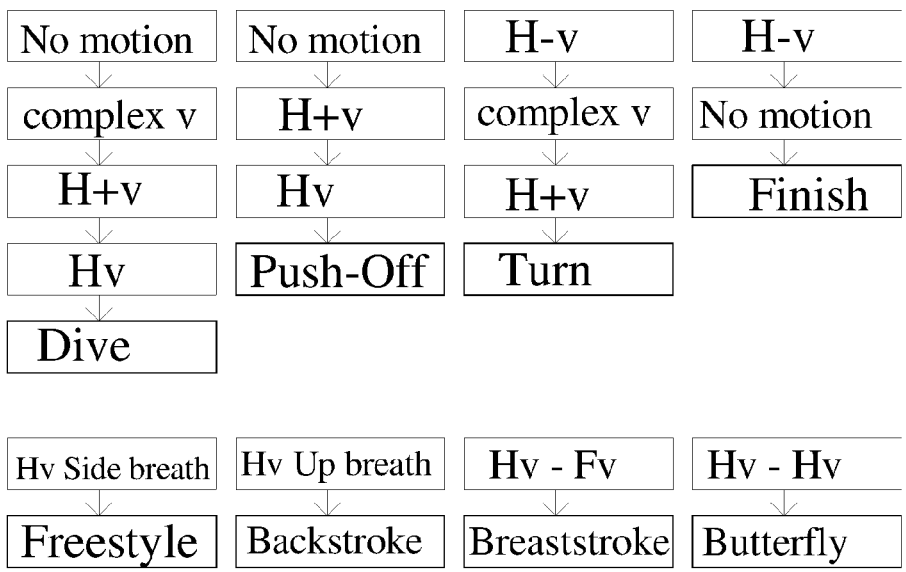

Using the procedures in FIG. 5(d) to determine the actions of the swimmer, application programs stored in the non-volatile memory (532) of the integrated circuit (530) in the electric controller (500) can support sophisticated control of the light reflector (513), the light blocking cover (515), and the electric sound speaker (505). FIG. 5(e) is a flowchart for an exemplary application program used by the electric controller in FIG. 5(c). When a dive or push-off is detected after a resting state, the integrated circuit (530) starts to execute speed and distance calculations. If the motion sensor (520) is an accelerometer, speed can be calculated by integration of acceleration along head direction, and distance can be calculated by integration of speed. Using the electric sound speaker (505), the integrated circuit (530) also can play music that is stored in integrated circuit memory device (532). The volume and channel control buttons (521-524) also can be disabled to prevent accidental changes caused by water, which can exert forces against the buttons. Furthermore, the integrated circuit (530) would measure time using an internal timer, wait for 5 seconds, and check if the swimmer is swimming in backstroke or not by detecting face direction of the swimmer. If the swimmer is swimming backstroke, the integrated circuit (530) switches the light reflector (513) to backstroke position, and opens the light blocking cover (515) so that the swimmer can view the end of the swimming pool. The integrated circuit can also lap count. After the motion sensor (520) detects a large negative acceleration in the head direction (H −Acc), the integrated circuit (530) analyzes the next action of the swimmer. If the swimmer makes a turn, then the integrated circuit (530) updates the lap count, and reports the lap count to the swimmer using the electric sound speaker (505); optionally, the lap time and stroke count of the swimmer also can be reported to the swimmer at this time. If the swimmer stops swimming, then the integrated circuit (530) reports the total time to the swimmer using the electric sound speaker (505); optionally, the total time can be compared with target times, and the integrated circuit (530) can provide feedback such as encouraging words using the electric sound speaker (505); music also can be turned off, while the volume and channel control buttons (521-524) can be enabled at this time.

FIG. 5(*f*) is a flowchart for another exemplary application program used by the electric controller in FIG. 5(*c*). In this example, when a push-off or a dive is detected after resting state, the integrated circuit (530) starts time measurement, disables volume and channel control buttons (521-524), and starts speed and distance calculations. It also can measure dive distance. After the swimmer takes a stroke, the integrated circuit (530) determines the stroke type and updates the stroke count. The integrated circuit (530) can also estimate the number of Calories burned by the swimmer based on the outputs of the motion sensor. Feedback can be provided using voice through the electric sound speaker (505). After the motion sensor (520) detects a large negative acceleration in the head direction (H −Acc), the integrated circuit (530) analyzes the next action of the swimmer. If the swimmer makes a turn, then the integrated circuit (530) will update the lap count, and report the lap count to the swimmer using the electric sound speaker (505); optionally, the lap time, stroke count, and Calories burned by the swimmer also can be reported at this time. If the swimmer stops swimming, then the integrated circuit (530) reports the total time to the swimmer using the electric sound speaker (505); optionally, the total time can be compared with target times, and the integrated circuit (530) can provide feedback such as encouraging words using the electric sound speaker (505). The total number of Calories burned by the swimmer can be reported, while the volume and channel control buttons (521-524) can be enabled at this time.

While the preferred embodiments have been illustrated and described herein, other modifications and changes will be evident to those skilled in the art. It is to be understood that there are many other possible modifications and implementations so that the scope of the invention is not limited by the specific embodiments discussed herein. Using a programmable integrated circuit, a swimming goggle equipped with an electric controller is capable of performing wide varieties of functions to support a swimmer wearing the swimming goggle. FIG. 5(*g*) shows a table that lists exemplary modes supported by the electric controller in FIG. 5(*c*). For example, when the mode-select switches (M1-M4) are set to be (0, 1, 0, 0), the electric sound speaker (505) is enabled to play music. The electric sound speaker (505) is able to change the way to play music depending on the motions of the swimmer wearing the swimming goggle. For example, when the mode-select switches (M1-M4) are set to be (0,1,1,0), the electric sound speaker (505) plays music with a pace that is synchronized with the swimming pace of the swimmer; when the mode-select switches (M1-M4) are set to be (0,1,1,1), the integrated circuit (630) adjusts the volume of the music played by the electric sound speaker (505) according to the swimming speed of the swimmer; when the mode-select switches (M1-M4) are set to be (1,0,1,1), the integrated circuit (630) uses the electric sound speaker (505) to provide a voice report of the estimated number of Calories burned by the swimmer; and when the mode-select switches (M1-M4) are set to be (1,1,1,1), the integrated circuit (630) store data to the non-volatile memory for further detailed analysis. The electric sound speaker of the swimming goggle is able to play music at a beat or a volume that is related to the motions of the swimmer wearing the swimming goggle. More examples are listed in FIG. 5(*g*).

Figure 6A:
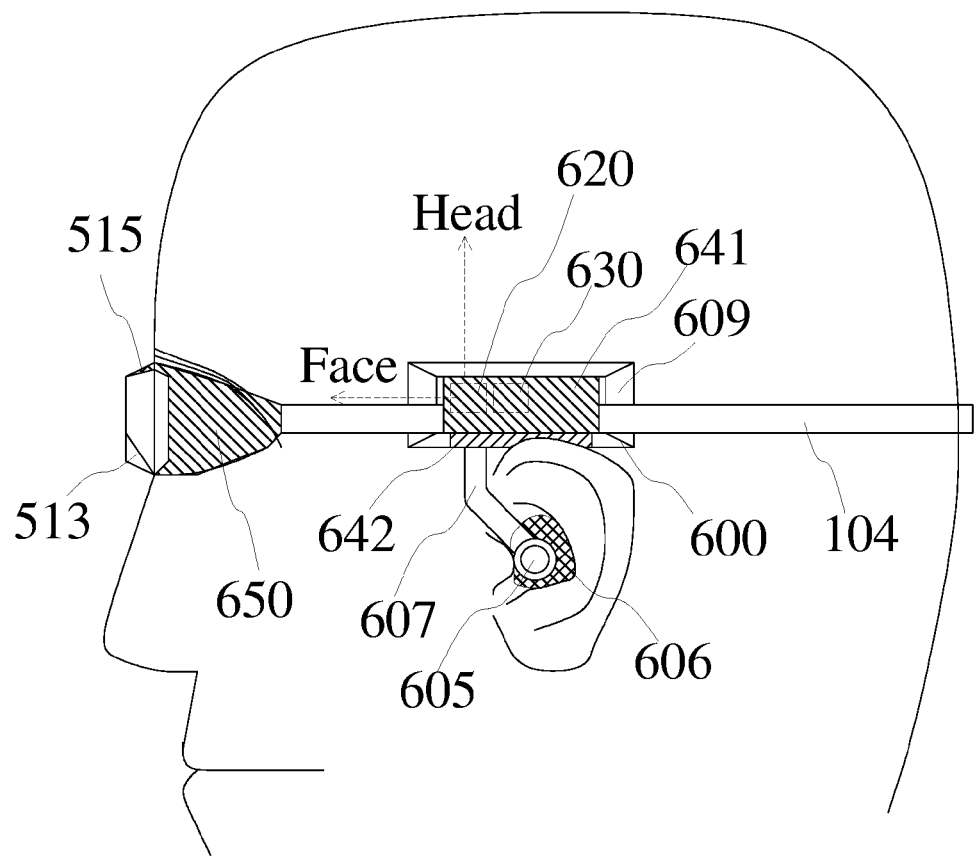
FIGS. 6(*a-c*) are simplified symbolic diagrams showing the structures of an exemplary electronic attachment for a swimming goggle.
Figure 6B:
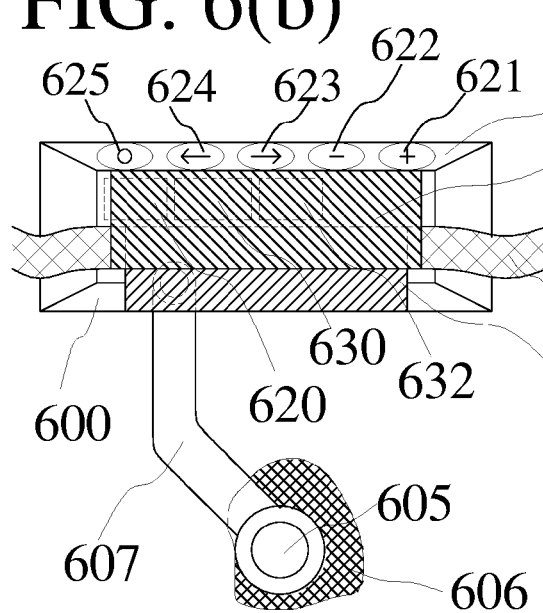
Figure 6C:
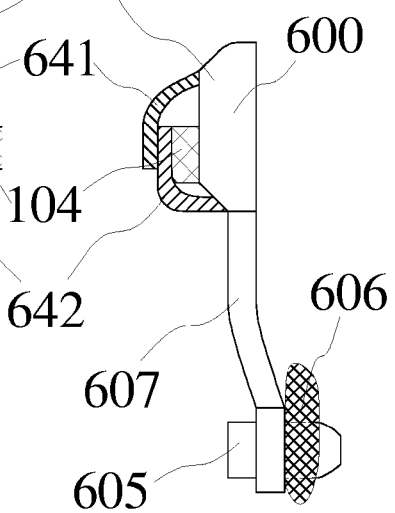

The exemplary electronic controller (500) and the electric sound speaker (505) in FIG. 5(*a*) are embedded inside a swimming goggle. When the electronic controller is built-in as part of a swimming goggle, it is naturally inseparable from the goggle, which allows the controller to withstand forces exerted by the water while swimming. The disadvantage of having an embedded electric controller in a swimming goggle is that the controller will be useless once the goggle breaks or wears out. FIGS. 6(*a-c*) are simplified symbolic diagrams showing the structures of an exemplary electronic attachment for a swimming goggle that solves the problem. The electronic device (600) in this example is able to withstand strong forces in the water when swimmers are diving, turning, or swimming various strokes at high speeds. Furthermore, this electronic device (600) can be detached from the swimming goggle (650) so that the same electronic device can be used with different swimming goggles.

FIG. 6(*a*) is a simplified symbolic diagram showing a swimmer wearing a swimming goggle (650) with an electronic device (600) attached to the head strap (104) of the swimming goggle. For this example, the swimming goggle comprises an eye socket that has a transparent forward viewing window attached to a goggle frame, where the goggle frame has a backstroke viewing window opened on a top portion of the goggle frame disposed away from the transparent forward viewing window, and a position-switchable light blocking cover (515) attached to an edge of the backstroke viewing window. This light blocking cover (515) can switch position with respect to the edge of the backstroke viewing window. Its position is controlled electronically by the electronic device (600) that is attached to the swimming goggle. This swimming goggle (650) further comprises a position-switchable light reflector (513) that can switch positions with respect to the front viewing window of the eye socket. The position of the position-switchable light reflector (513) is controlled electronically by the electronic device (600) attached to the swimming goggle.

The electronic device (600) attached to the head strap (104) of the swimming goggle (650) comprises a motion sensor (620), an electric sound speaker (605), an integrated circuit (630), a water-proof package (609) that encloses the motion sensor (650) and the integrated circuit (630), and a connector to attach the water-proof package (609) to the head strap (104) of a swimming goggle (650). In this example, a loop Velcro (641) and a hook Velcro (642) wrap around the head strap (104) of the swimming goggle (650) to provide a reliable attachment between the water-proof package (609) and the head strap (104) of the swimming goggle (650), as shown in FIGS. 6(*a-c*). The water-proof package (609) also can enclose other components such as a USB interface socket, none-volatile memory device (632), battery, power switches, and other control switches. As shown in FIG. 6(*b*), the front panel of the water-proof package (609) comprises two volume control switches (621-622), two channel-select switches (623, 624), and a power switch (625); it can also have a USB interface socket and mode-select switches placed at the back side of the package. A motion sensor (620) is placed inside the electronic device (600) as shown by the dashed lines in FIG. 6(*a*). While in use, this motion sensor (620) is attached near the ear of the swimmer, where its x axis is pointing towards the "face direction", and its y axis is pointing towards the "head direction", as illustrated by the dashed lined arrows in FIG. 6(*a*). The integrated circuit (630) in the electronic device (600) is able to read the outputs of the motion sensor (620) and analyze the motions of the swimmer wearing the swimming goggles with the attached electronic device while the swimmer is swimming in water. The electronic device (600) illustrated in FIGS. 6(*a-c*) comprises all the components of the electronic controller (500) described in FIGS. 5(*a-c*). Therefore, it is able to support all the functions described in FIGS. 5(*d-g*).

For the example in FIGS. 6(*a-c*), the electric sound speaker (605) is placed inside an earbud. Typical earbuds would easily fall out while the swimmer is swimming in water. The electric sound speaker (605) in this example is placed inside an earbud that has a moldable ear tip (606), as shown in FIGS. 6(*a-c*). This moldable ear tip (606) can be molded into different shapes in order to tightly fit the external ear canal of different users. In addition, the earbud (605) is connected to the water-proof package (609) of the electronic device with a solid elastic connector (607). This elastic connector (607) provides an elastic force that helps push the earbud into the external ear canal of the swimmer, as illustrated in FIGS. 6(*a-c*). As a result, the earbud (605) will not fall out when the swimmer is diving, turning, or swimming at high speed.

Figure 7A:
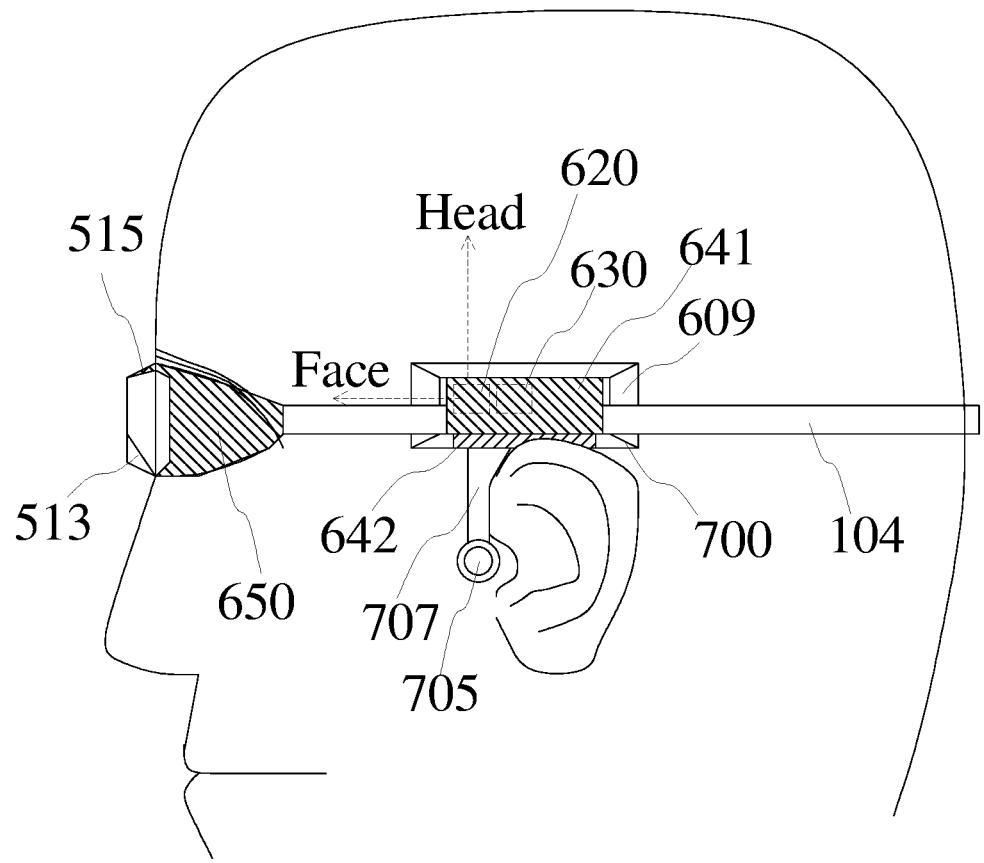
FIGS. 7(*a-c*) are simplified symbolic diagrams showing the structures of another exemplary electronic attachment for a swimming goggle.
Figure 7B:
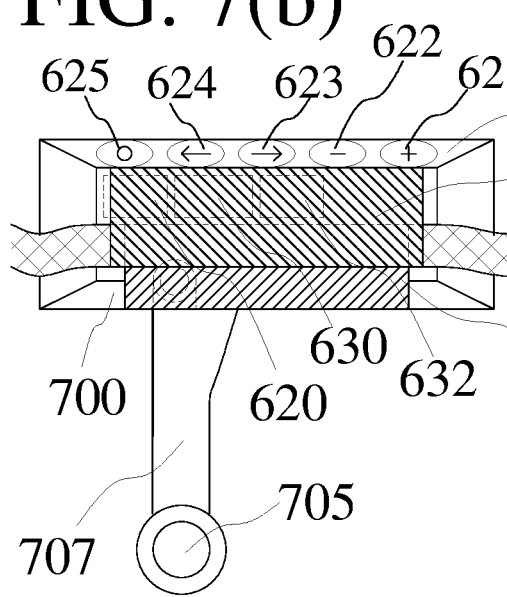
Figure 7C:
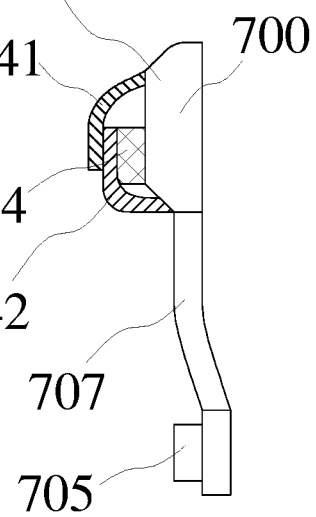

FIGS. 7(*a-c*) are simplified symbolic diagrams showing the structures of another exemplary electronic attachment for a swimming goggle. The structures of the electronic device (700) in FIGS. 7(*a-c*) are almost identical to those of the electronic device (600) in FIGS. 6(*a-c*), except for the supporting structures of the electric sound speaker (705). For this example, the electric sound speaker (705) of the electronic device (700) is attached to the water-proof package (609) of the electronic device (700) with a sold elastic connector (707), and the electric sound speaker (705) is pressed onto the side of the head of the swimmer, as shown in FIGS. 7(*a-c*). In this way, the electric sound speaker (705) can function reliably when the swimmer is diving, turning, or swimming at high speed.

While the preferred embodiments have been illustrated and described herein, other modifications and changes will be evident to those skilled in the art. It is to be understood that there are many other possible modifications and implementations so that the scope of the invention is not limited by the specific embodiments discussed herein. For example, accelerometers are one type of motion sensors that can support applications of the present invention, but other types of devices also can be used to analyze the activities of users. FIGS. 8(*a, b*) are simplified symbolic diagrams showing the structures of another exemplary electronic device attached to a swimming goggle. The structures of the electronic device (800) in FIGS. 8(*a, b*) are almost identical to those of the electronic device (600) in FIGS. 6(*a-c*). The difference is that the device has two flow meters (801, 802) placed near the upper left corner of the electronic device (800). As illustrated in FIG. 8(*a*), one flow meter (801) is placed on the upper side wall (803) of the electronic device (800), so that it can measure the component of the fluid speed along the "head" direction, while the other flow meter (802) is placed on the left side wall (804) of the electronic device (800), so that it can measure the component of the fluid speed along the "face" direction. These two flow meters (801, 802) can therefore measure the fluid speed as a two-dimensional vector.

FIG. 8(*b*) is a simplified symbolic diagram illustrating the structures for one (801) of the flow meters (801, 802) in FIG. 8(*a*). The direction of the fluid flow (819, 835, 845) is represented symbolically by dashed-lined arrows in FIGs. (b, d, f). Examples of fluid flows are water flows caused by the motions of swimmers or air flows caused by the motions of cyclists or runners. For the example in FIG. 8(*b*), when fluid flow (819) along the "face" direction impacts the upper side-wall (803) of the electronic device (800), the fluid flow (810) produces a force on the upper side-wall (803). In this example, the upper side wall (803) is made of flexible plastic material so that the force produced by the relative fluid flow (819) pushes against a solid plate (811) placed underneath the side wall (803), as shown in FIG. 8(*b*). The resulting force on the upper side-wall (803) passes through the solid plate (811) and a pillar (812) to be measured by a pressure sensor (813), as illustrated in FIG. 8(*b*). One example of a pressure sensor that can be used for this application is a piezoelectric device. The output of the pressure sensor (813) is amplified by a linear amplifier (814), and the output of the linear amplifier (814) is connected to an input of an integrated circuit (830). This integrated circuit (830) analyzes the electric outputs of the linear amplifier (814) to determine the speed of the fluid flow (819), which provides an accurate measurement on the speed of body motions. This fluid speed measurement provides one of the factors used to analyze the actions of the user wearing the electronic device (800). For this example, the structures (803, 811, 812) that transfer & fluid pressure, the pressure sensor (813), and the linear amplifier (814) form a flow meter. The other flow meter (802) shown in FIG. 8(*a*) can have similar or different structures.

Figure 8A:
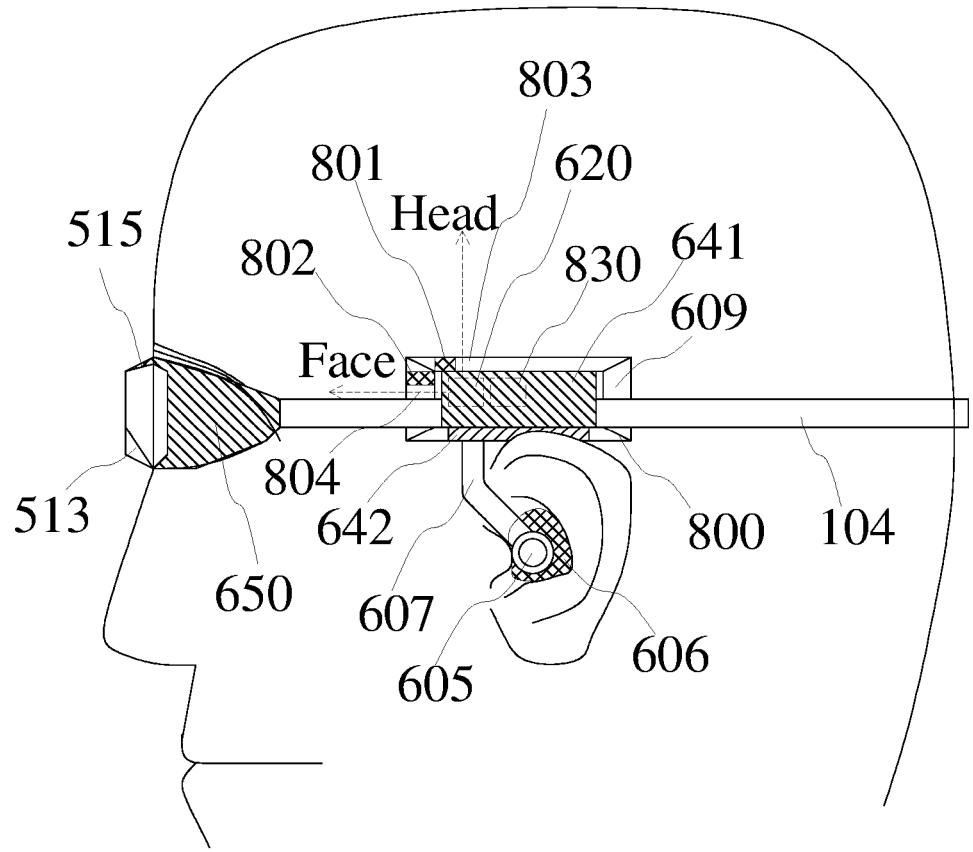
FIGS. 8(*a-g*) are exemplary symbolic diagrams illustrating the structures of electronic devices equipped with flow meters that are attached to athletic headgear.
Figure 8B:
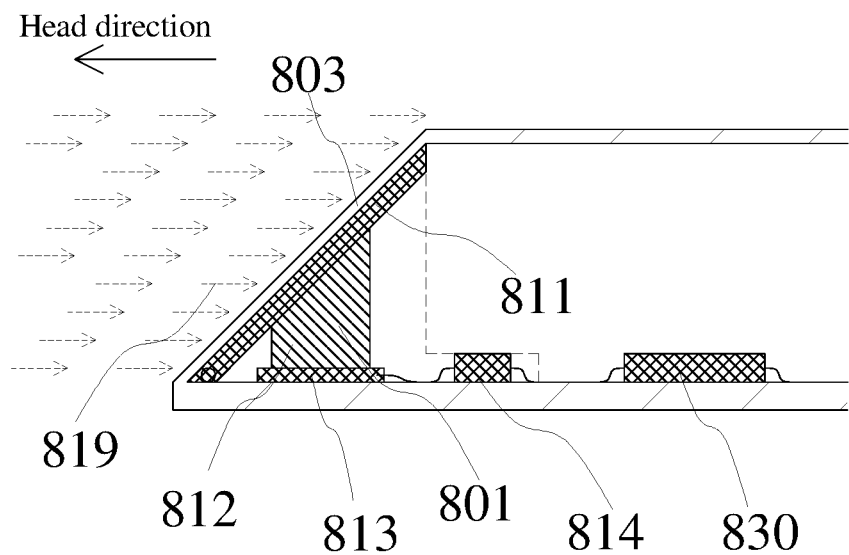

FIG. 9(*a*) is a simplified block diagram that shows the components of the electronic device (800) in FIG. 8(*a*). The structures of this electronic device (800) are nearly the same as those of the electronic controller (500) shown in FIG. 5(*c*), except that this electronic device (800) comprises flow meters (801, 802), and that the intelligence of the electronic device (800) is provided by an integrated circuit (830) that is able to analyze the outputs of the flow meters (801, 802). In this example, the integrated circuit (830) also comprises a memory module (532) and a logic module (531). One example of a logic module is a programmable microcontroller. One example of a memory module is a FLASH nonvolatile memory device. The memory module (532) and the logic module (531) can be one integrated circuit chip in the same package, and can also be separated integrated circuit chips in separated packages. In this example, the integrated circuit is programmable through the Universal Serial Bus (USB) interface (529). A computer or a mobile electronic device can be used to program the integrated circuit (830) using the USB interface (529). The logic module (531) of the integrated circuit (830) is able to analyze the outputs of the flow meters (801, 802) to determine the outputs of the integrated circuit (830) while the user wearing the electronic device (800) is in action. The integrated circuit (830) is able to control the position of the reflector (513) and the light blocking cover (515) of the swimming goggle based on the motions of the user detected by the flow meters (801, 802). The integrated circuit is also able to control the outputs of the electric sound speaker (505) while the user wearing the electronic device (800) is swimming, biking, running, or doing other exercise.

FIG. 5(h) is a simplified symbolic flow chart for the sequences of events used to determine the actions of the swimmer wearing the electronic device (800) in FIGS. 9(a, b). In FIG. 5(h), the symbol "H+v" means that the flow meters detected a brief and sudden interval of high speed fluid flow in the head direction; the symbol "H−v" means that the flow meters detected a decrease in velocity in the head direction; the symbol "Hv" means that the flow meters detected regular speed in the head direction; the symbol "Fv" means that the flow meters detected fluid flow in the face direction; the symbol "HFv" means that the flow meters detected fluid flow in both the head direction and face direction; and the symbol "complex v" means that the flow meters detected complex fluid flows in both the head direction and face direction due to complex actions such as diving into water, or performing a turn. For example, if the flow meters (801, 802) detect no initial motion, followed by complex fluid flows (complex v), followed by a brief and sudden interval of high speed fluid flow in the head direction (H+v), and ending with regular speed in the head direction (Hv), then the integrated circuit (830) would know that the swimmer just dived into water. This process is shown in the first column of FIG. 5(h). If the flow meters (801, 802) detect no initial motion, followed by a brief and sudden interval of high speed fluid flow in the head direction (H+v) without severely complex fluid flows, and ending with regular speed in the head direction (Hv), then the integrated circuit (830) would know that the swimmer just pushed off the wall of a swimming pool. This process is shown in the second column of FIG. 5(h). If the flow meters (801, 802) detect a decrease in velocity in the head direction (H−v), followed by complex fluid flows (complex v), and ending with a brief and sudden interval of high speed fluid flow in the head direction (H+v), then the integrated circuit (830) would know that the swimmer just performed a turn. This process is shown in the third column of FIG. 5(h). If the flow meters (801, 802) detect a decrease in velocity in the head direction (H−v), which eventually ends with no motion, then the integrated circuit (830) would know that the swimmer just finished swimming. This process is shown in the fourth column of FIG. 5(h). When the swimmer is swimming with regular speed in the head direction and breathes sideways (Hv Side breath), then the integrated circuit (830) would know that the swimmer is swimming freestyle; when the swimmer is swimming with regular speed in the head direction and breathes facing skywards (Hv Up breath), then the integrated circuit (830) would know that the swimmer is swimming backstroke; when the flow meters (801, 802) detect an interval of head direction flow and an interval of face direction flow (Hv−Fv) during each armstroke, then the integrated circuit (830) would know that the swimmer is swimming either breaststroke or butterfly, which can be distinguished by detailed analysis.

Using the procedures in FIG. 5(h) to determine the actions of the swimmer, application programs stored in the non-volatile memory (532) of the integrated circuit (830) in the electronic device (800) can support sophisticated control of the light reflector (513), the light blocking cover (515), and the electric sound speaker (505). The integrated circuit (830) would be able to support all the analyses shown in FIGS. 5(e-g). It would also be able to analyze the actions of bikers, runners, and users of other athletic headgear.

While the preferred embodiments have been illustrated and described herein, other modifications and changes will be evident to those skilled in the art. It is to be understood that there are many other possible modifications and implementations so that the scope of the invention is not limited by the specific embodiments discussed herein. For example, the flow meter (801) in the above examples measures fluid pressure on the side wall (803), but other types of flow meters can be used to analyze the activities of the users as well. The electronic device (800) in FIGS. 8(a, b) is attached to a swimming goggle, while electronic devices with flow meters also can attach to other types of athletic headgear. FIGS. 8(c, d) are simplified symbolic diagrams showing the structures of another exemplary electronic device (820) attached to a sweat band (821). The structures of the electronic device (820) in FIGS. 8(c, d) are almost identical to those of the electronic device (800) in FIGS. 8(a, b). These are the differences: it is attached to a sweat band (821) with velcro (822), and it has a flow meter (825) that measures fluid speed using Bernoulli's Principle.

Figure 8C:
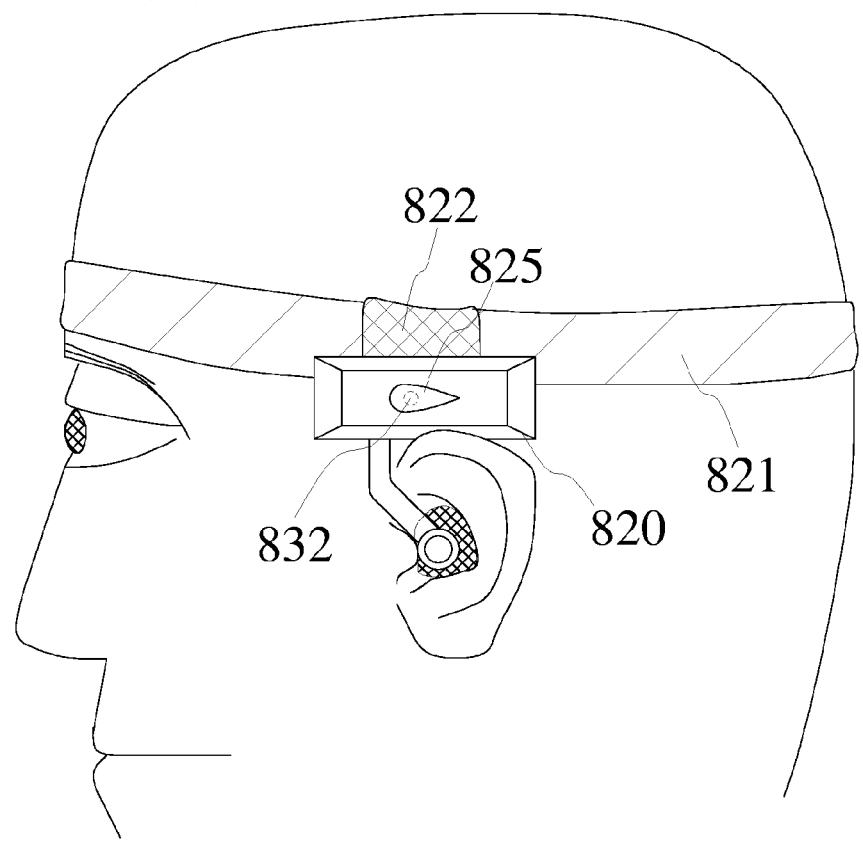
Figure 8D:
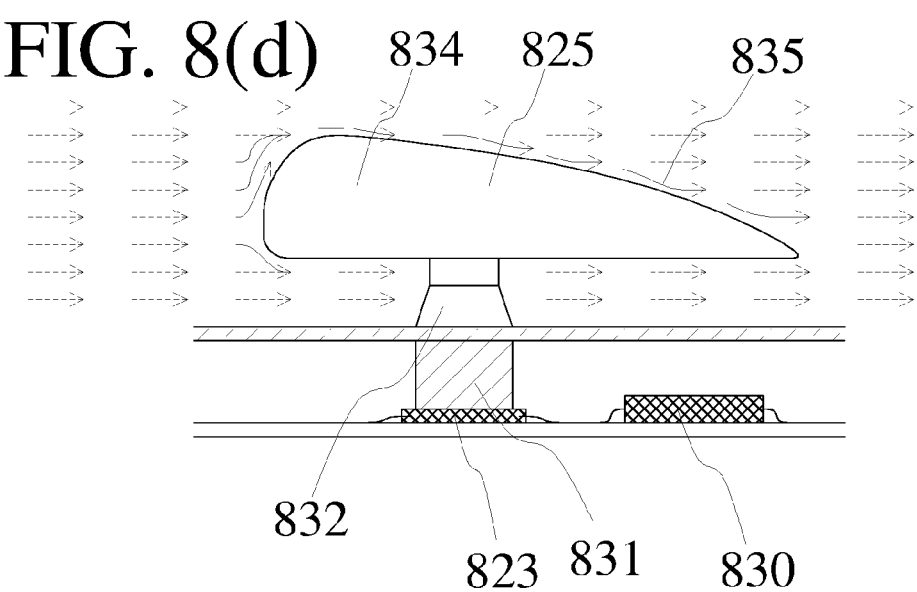
Figure 9A:
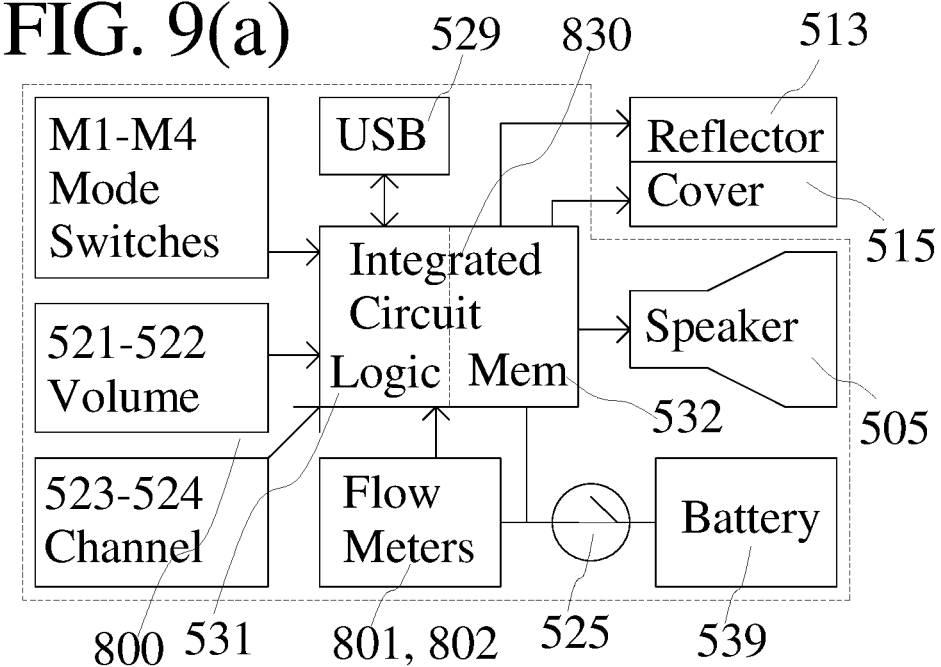
FIG. 9(*a*) is an exemplary symbolic block diagram for the electronic devices and output devices in FIGS. 8(*a-d*)

FIG. 8(d) is a simplified symbolic cross-section diagram illustrating the structures of the flow meter (825) in FIG. 8(c). This flow meter (825) comprises a sensing wing (834) with cross-section structures similar to those of an airplane wing. When fluid (835) passes through this sensor wing (834), a lifting force is produced on the wing due to Bernoulli's Principle. This lifting force is transferred through a pole (832) outside of the package of the electronic device (820) and a pillar (831) inside of the electronic device (820) to a pressure sensor (823), as illustrated in FIG. 8(d). The output of the pressure sensor (823) is connected to an input of an integrated circuit (830). This integrated circuit (830) analyzes the electric outputs of the pressure sensor (823) to determine the speed of the fluid flow (835) as one of the factors used to analyze the actions of the user wearing the electronic device (820). For this example, the sensor wing (834), the structures (832, 831) that transfer lifting forces, and the pressure sensor (823) form a flow meter. The components of this electronic device (820) can be similar to that in FIG. 9(a), except that the device uses a different type of flow meter (825).

FIGS. 8(e-g) are simplified symbolic diagrams showing the structures of another exemplary electronic device (840) attached to a bicycle helmet (841). The structures of the electronic device (840) in FIGS. 8(e, f) are almost identical to those of the electronic device (820) in FIGS. 8(c, d). These are the differences: the device is attached to a bicycle helmet (841) with velcro (842), it has a flow meter (845) that measures fluid speed using a rotational turbine (846), and it is equipped with an inclinometer (852). An inclinometer is an instrument for measuring angles of slope (or tilt), elevation or depression of an object with respect to gravity.

FIG. 8(f) is a simplified symbolic cross-section diagram illustrating the structures of the flow meter (845) and the inclinometer meter (852) in FIG. 8(e). This flow meter (845) comprises a rotational turbine (846). When fluid (859) passes through this rotational turbine (846), the rotational speed of the turbine (846) provides a measure of the fluid speed; rotational rate of the turbine (846) measures speed while number of rotations of the turbine (846) measures distance. In addition, the turbine (846) also provides energy to an electric power generator (847) that is able to generate electric power to re-charge the battery (530) in the electronic device (840). Other types of rotational structures, such as paddle wheels, also can serve similar functions. The turbine (846) in this example is mounted on a rotational axis (850) so that the flow meter (845) is always pointing in the direction of fluid flow. FIG. 8(f) shows a situation when the fluid flow (846) is in a different direction.

For a bicyclist, the energy needed to ride a bike is not only dependent on speed, but is also dependent on the slope of the road. It is therefore desirable to be able to measure the slope of the road. Therefore, the electronic device in FIGS. 8(e-g) is equipped with an inclinometer (852). For this example, the inclinometer (852) comprises a weight (851) attached to a rod (853) that can rotate freely against a rotational axis (850). Due to the force of gravity on the weight (851), this inclinometer (852) is always pointing downward. When the bicyclist is riding on a flat road, the inclinometer and the flow meter (845) are perpendicular to each other, as illustrated in FIG. 8(f). When the bicyclist is riding uphill, the angle between the flow meter (845) and the inclinometer (852) is obtuse, as illustrated in FIG. 8(g). When the bicyclist is riding downhill, the angle between the flow meter (845) and the inclinometer (852) is acute. Therefore, the slope of road can be measured by measuring the angle between the flow meter (845) and the inclinometer (852).

Figure 9B:
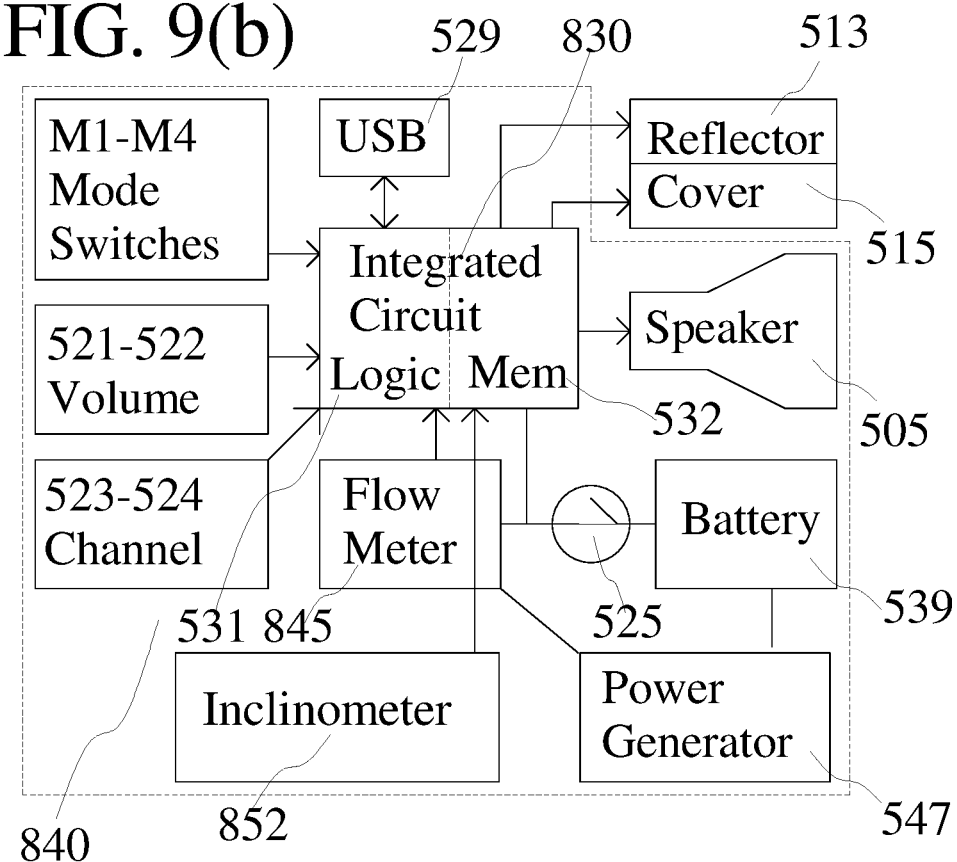

FIG. 9(b) is a simplified symbolic block diagram showing the structures of the electronic device (840) in FIGS. 8(e-g). The structures of this electronic device (840) are nearly the same as those of the electronic device (800) shown in FIG. 9(a). The differences are that this electronic device (840) comprises a different type of flow meter (845), and that it has an inclinometer (852) and a power generator (547). The electric power generator (547) utilizes the energy provided by the flow meter (845) to charge the battery (539), as shown in FIG. 9(b). In this example, the integrated circuit (830) also comprises a memory module (532) and a logic module (531). The logic module (531) of the integrated circuit (830) is able to analyze the outputs of the flow meter (845) to determine the outputs of the integrated circuit (830) while the user wearing the electronic device (840) is in action. The integrated circuit (830) can determine the slope of the road by measuring the angles between the flow meter (845) and the inclinometer (852) when the electronic device (840) is used by a bicyclist or a runner. The integrated circuit is also able to control the outputs of the electric sound speaker (505) while the user wearing the electronic device (840) is swimming, biking, running, or doing some other exercise.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

What is claimed is:

1. An electronic device comprising:
    a flow meter that measures the velocity of fluid movement, where said flow meter directly measures the relative velocity of the fluid near said electronic device without the need to calculate velocity from acceleration measurements;
    an electric sound speaker;
    an integrated circuit; and
    a connector to attach the electronic device to athletic headgear;
    wherein said integrated circuit is able to analyze the speed of fluid near said electronic device measured by said flow meter, and provide voiced feedback using said electric sound speaker to the user wearing the athletic headgear.

2. The electronic device in claim 1 further comprises more than one flow meter.

3. The electronic device in claim 1 further comprises an inclinometer.

4. The electronic device in claim 1 further comprises an electric power generator.

5. The electronic device in claim 1 comprises a connector to attach the electronic device to a swimming goggle.

6. The electronic device in claim 1 comprises a connector to attach the electronic device to a helmet.

7. The electronic device in claim 1 comprises a connector to attach the electronic device to a hat.

8. The electronic device in claim 1 wherein the integrated circuit uses the outputs of the flow meter as one of the factors to determine the speed of the user wearing the electronic device.

9. The electronic device in claim 1 wherein the integrated circuit uses the outputs of the flow meter as one of the factors to determine the distance the user has traveled.

10. The electronic device in claim 1 wherein the integrated circuit uses the outputs of the flow meter as one of the factors to determine the Calories burnt by the user wearing the electronic device.

11. The electronic device in claim 1 wherein the integrated circuit uses the outputs of the flow meter as one of the factors to determine how music is played through the electric sound speaker.

12. The electronic device in claim 1 comprises a non-volatile memory device.

13. The electronic device in claim 1 is programmable by a computer or a mobile electronic device.

14. The electric sound speaker of the electronic device in claim 1 is able to provide a voice that reports the speed of the user wearing the electronic device while the user is in action.

15. The electric sound speaker of the electronic device in claim 1 is able to provide a voice that reports the distance traveled by the user wearing the electronic device while the user is in action.

16. The electric sound speaker of the electronic device in claim 1 is able to provide a voice that reports the number of Calories burned by the user wearing the electronic device while the user is in action.

17. A method for building an electronic device comprising the steps of:
    providing a flow meter that measures the velocity of fluid movement, where said flow meter measures the relative velocity of the fluid near said electronic device without the need to calculate velocity from acceleration measurements;
    providing an electric sound speaker;
    providing an integrated circuit; and
    providing a connector to attach the electronic device to an athletic headgear;
    wherein said integrated circuit is able to analyze the speed of fluid near said electronic device measured by said flow meter, and provide voiced feedback using said electric sound speaker to the user wearing the athletic headgear.

18. The method for building an electronic device in claim 17 further comprises a step of providing more than one flow meters.

19. The method for building an electronic device in claim 17 further comprises a step of providing an inclinometer.

20. The method for building an electronic device in claim 17 further comprises the step of providing an electric power generator.

* * * * *